US012494167B2

(12) United States Patent
Ren et al.

(10) Patent No.: US 12,494,167 B2
(45) Date of Patent: Dec. 9, 2025

(54) PIXEL DRIVE CIRCUIT AND DRIVE METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Huaisen Ren, Beijing (CN); Yonglin Guo, Beijing (CN); Miao Wang, Beijing (CN); Tao Gao, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/028,760

(22) PCT Filed: Mar. 18, 2022

(86) PCT No.: PCT/CN2022/081717
§ 371 (c)(1),
(2) Date: Mar. 28, 2023

(87) PCT Pub. No.: WO2023/173411
PCT Pub. Date: Sep. 21, 2023

(65) Prior Publication Data
US 2025/0078743 A1 Mar. 6, 2025

(51) Int. Cl.
*G09G 3/3233* (2016.01)
*G09G 3/3208* (2016.01)

(52) U.S. Cl.
CPC ......... *G09G 3/3233* (2013.01); *G09G 3/3208* (2013.01); *G09G 2300/0819* (2013.01);
(Continued)

(58) Field of Classification Search
CPC ............... G09G 3/3233; G09G 3/3208; G09G 2300/0819; G09G 2300/0842; G09G 2300/0861; G09G 2310/08
(Continued)

(56) References Cited

U.S. PATENT DOCUMENTS 11,211,004 B1 * 12/2021 Kim ..................... G09G 3/3233
2016/0365030 A1 12/2016 Wu
(Continued)

FOREIGN PATENT DOCUMENTS

CN 104575394 B 2/2017
CN 107452338 A 12/2017
(Continued)

*Primary Examiner* — Jimmy H Nguyen
(74) *Attorney, Agent, or Firm* — Ling Wu; Stephen Yang; Ling and Yang Intellectual Property

(57) ABSTRACT

Disclosed is a pixel drive circuit which is configured to drive a light emitting element to emit light and includes: a node control sub-circuit, configured to provide a signal of an initial signal terminal to a first node under control of a reset signal terminal, provide a signal of a second node to the first node under control of a scan signal terminal, and adjust a signal of the first node or the second node under control of a first control terminal; a drive sub-circuit, configured to provide a drive current to the second node under control of the first node and the third node; and a light emitting control sub-circuit, configured to provide a signal of a first power terminal to the third node and a signal of the second node to the fourth node under control of a light emitting control terminal.

18 Claims, 11 Drawing Sheets

(52) U.S. Cl.
CPC ............... *G09G 2300/0842* (2013.01); *G09G 2300/0861* (2013.01); *G09G 2310/08* (2013.01)

(58) Field of Classification Search
USPC ............................................ 345/204, 76, 82
See application file for complete search history.

(56) References Cited

U.S. PATENT DOCUMENTS

| | | | | |
|---|---|---|---|---|
| 2019/0019453 | A1 | 1/2019 | Chen | |
| 2019/0096327 | A1 | 3/2019 | Peng et al. | |
| 2019/0267440 | A1 | 8/2019 | Park et al. | |
| 2021/0049958 | A1 | 2/2021 | Kim et al. | |
| 2021/0407419 | A1* | 12/2021 | Li | G09G 3/3258 |
| 2023/0042060 | A1 | 2/2023 | Wang et al. | |

FOREIGN PATENT DOCUMENTS

| | | | |
|---|---|---|---|
| CN | 107230451 | B | 1/2018 |
| CN | 107610652 | A | 1/2018 |
| CN | 105810145 | B | 6/2018 |
| CN | 107068060 | B | 9/2019 |
| CN | 110211992 | A | 9/2019 |
| CN | 112397021 | A | 2/2021 |
| CN | 111583872 | B | 3/2021 |
| CN | 113571013 | A | 10/2021 |
| CN | 116210043 | A | 6/2023 |
| WO | 2023050255 | A1 | 4/2023 |

* cited by examiner

PIXEL DRIVE CIRCUIT AND DRIVE METHOD THEREOF, AND DISPLAY APPARATUS

CROSS-REFERENCE TO RELATED APPLICATION

The present application is a U.S. National Phase Entry of International Application No. PCT/CN2022/081717 having an international filing date of Mar. 18, 2022. The entire contents of the above-identified application are hereby incorporated by reference.

TECHNICAL FIELD

The present disclosure relates to, but is not limited to, the field of display technologies, in particular, to a pixel drive circuit and a drive method thereof, and a display apparatus.

BACKGROUND

An Organic Light Emitting Diode (OLED) and a Quantum dot Light Emitting Diode (QLED) are active light emitting display devices and have advantages such as self-luminescence, a wide viewing angle, a high contrast ratio, low power consumption, an extremely high response speed, lightness and thinness, flexibility, and a low cost. With constant development of display technologies, a flexible display apparatus (Flexible Display) in which an OLED or a QLED is used as a light emitting device and signal control is performed through a Thin Film Transistor (TFT) has become a mainstream product in the field of display at present.

SUMMARY

The following is a summary of subject matter described herein in detail. The summary is not intended to limit the protection scope of claims.

In a first aspect, the present disclosure provides a pixel drive circuit, which is configured to drive a light emitting element to emit light, including: a node control sub-circuit, a light emitting control sub-circuit, and a drive sub-circuit; and a working process of the pixel drive circuit includes: an initialization stage, a data writing stage, and a light emitting stage.

The node control sub-circuit is electrically connected with a first power terminal, a reset signal terminal, an initial signal terminal, a first control terminal, a second control terminal, a scan signal terminal, a data signal terminal, a first node, a second node, a third node, and a fourth node respectively, and is configured to provide a signal of the initial signal terminal to the first node under control of the reset signal terminal, provide a signal of the initial signal terminal to the fourth node under control of the second control terminal, provide a signal of the second node to the first node and a signal of the data signal terminal to the third node under control of the scan signal terminal, and adjust a signal of the first node or the second node under control of the first control terminal.

The drive sub-circuit is electrically connected with the first node, the second node, and the third node respectively, and is configured to provide a drive current to the second node under control of the first node and the third node.

The light emitting control sub-circuit is electrically connected with a light emitting control terminal, the first power terminal, the second node, the third node, and the fourth node respectively, and is configured to provide a signal of the first power terminal to the third node and a signal of the second node to the fourth node under control of the light emitting control terminal.

The light emitting element is electrically connected with the fourth node and a second power terminal respectively.

Among them, in the data writing stage and the light emitting stage, signals of the scan signal terminal and the first control terminal are mutually inverted signals.

In some possible implementation modes, the node control sub-circuit includes: a first reset sub-circuit, a second reset sub-circuit, a compensation sub-circuit, a writing sub-circuit, and an energy storage sub-circuit.

The first reset sub-circuit is electrically connected with the reset signal terminal, the initial signal terminal, and the first node respectively, and is configured to provide a signal of the initial signal terminal to the first node under control of the reset signal terminal.

The second reset sub-circuit is electrically connected with the second control terminal, the initial signal terminal, and the fourth node respectively, and is configured to provide a signal of the initial signal terminal to the fourth node under control of the second control terminal.

The compensation sub-circuit is electrically connected with the first control terminal, the scan signal terminal, the first node, and the second node respectively, and is configured to provide a signal of the second node to the first node under control of the scan signal terminal, and adjust a signal of the first node or the second node under control of the first control terminal.

The writing sub-circuit is electrically connected with the scan signal terminal, the data signal terminal, and the third node respectively, and is configured to provide a signal of the data signal terminal to the third node under control of the scan signal terminal.

The energy storage sub-circuit is electrically connected with the first node and the first power terminal respectively, and is configured to store a voltage difference between the first node and the first power terminal.

In some possible implementation modes, the first reset sub-circuit includes: two first transistors connected in series, and the second reset sub-circuit includes: a seventh transistor.

A control electrode of a first transistor is electrically connected with the reset signal terminal, a first electrode of the first transistor is electrically connected with the initial signal terminal, and a second electrode of the first transistor is electrically connected with a first electrode of a second first transistor.

A control electrode of the second first transistor is electrically connected with the reset signal terminal, and a second electrode of the second first transistor is electrically connected with the first node.

A control electrode of the seventh transistor is electrically connected with the second control terminal, a first electrode of the seventh transistor is electrically connected with the initial signal terminal, and a second electrode of the seventh transistor is electrically connected with the fourth node.

In some possible implementation modes, the compensation sub-circuit includes: two second transistors connected in series and an eighth transistor.

A control electrode of a first second transistor is electrically connected with the scan signal terminal, a first electrode of the first second transistor is electrically connected with the second node, and a second electrode of the first second transistor is electrically connected with a first electrode of a second transistor.

A control electrode of the second transistor is electrically connected with the scan signal terminal, and a second electrode of the second transistor is electrically connected with a first electrode of the eighth transistor.

A control electrode of the eighth transistor is electrically connected with the first control terminal, and a second electrode of the eighth transistor is electrically connected with the first node and a first electrode of the eighth transistor respectively.

In some possible implementation modes, the compensation sub-circuit includes: two second transistors connected in series and an eighth transistor.

A control electrode of a first second transistor is electrically connected with the scan signal terminal, a first electrode of the first second transistor is electrically connected with a second electrode of the eighth transistor, and a second electrode of the first second transistor is electrically connected with a first electrode of a second transistor.

A control electrode of the second transistor is electrically connected with the scan signal terminal, and a second electrode of the second transistor is electrically connected with the first node.

A control electrode of the eighth transistor is electrically connected with the first control terminal, and a first electrode of the eighth transistor is electrically connected with the second node and the second electrode of the eighth transistor respectively.

In some possible implementation modes, the writing sub-circuit includes: a fourth transistor, and the energy storage sub-circuit includes: a capacitor.

A control electrode of the fourth transistor is electrically connected with the scan signal terminal, a first electrode of the fourth transistor is electrically connected with the data signal terminal, and a second electrode of the fourth transistor is electrically connected with the third node.

A first terminal of the capacitor is connected with the first power terminal, and a second terminal of the capacitor is electrically connected with the first node.

In some possible implementation modes, the drive sub-circuit includes: a third transistor, and the light emitting control sub-circuit includes: a fifth transistor and a sixth transistor.

A control electrode of the third transistor is electrically connected with the first node, a first electrode of the third transistor is connected with the second node, and a second electrode of the third transistor is connected with the third node.

A control electrode of the fifth transistor is electrically connected with the light emitting signal terminal, a first electrode of the fifth transistor is electrically connected with the first power terminal, and a second electrode of the fifth transistor is electrically connected with the third node.

A control electrode of the sixth transistor is electrically connected with the light emitting signal terminal, a first electrode of the sixth transistor is electrically connected with the second node, and a second electrode of the sixth transistor is electrically connected with the fourth node.

In some possible implementation modes, the node control sub-circuit includes: two first transistors connected in series, two second transistors connected in series, a fourth transistor, a seventh transistor, an eighth transistor, and a capacitor, the drive sub-circuit includes: a third transistor, and the light emitting control sub-circuit includes: a fifth transistor and a sixth transistor.

A control electrode of a first transistor is electrically connected with the reset signal terminal, a first electrode of the first transistor is electrically connected with the initial signal terminal, and a second electrode of the first transistor is electrically connected with a first electrode of a second first transistor.

A control electrode of the second first transistor is electrically connected with the reset signal terminal, and a second electrode of the second first transistor is electrically connected with the first node.

A control electrode of a first second transistor is electrically connected with the scan signal terminal, a first electrode of the first second transistor is electrically connected with the second node, and a second electrode of the first second transistor is electrically connected with a first electrode of a second transistor.

A control electrode of the second transistor is electrically connected with the scan signal terminal, and a second electrode of the second transistor is electrically connected with a first electrode of the eighth transistor.

A control electrode of the third transistor is electrically connected with the first node, a first electrode of the third transistor is connected with the second node, and a second electrode of the third transistor is connected with the third node.

A control electrode of the fourth transistor is electrically connected with the scan signal terminal, a first electrode of the fourth transistor is electrically connected with the data signal terminal, and a second electrode of the fourth transistor is electrically connected with the third node.

A control electrode of the fifth transistor is electrically connected with the light emitting signal terminal, a first electrode of the fifth transistor is electrically connected with the first power terminal, and a second electrode of the fifth transistor is electrically connected with the third node.

A control electrode of the sixth transistor is electrically connected with the light emitting signal terminal, a first electrode of the sixth transistor is electrically connected with the second node, and a second electrode of the sixth transistor is electrically connected with the fourth node.

A control electrode of the seventh transistor is electrically connected with the second control terminal, a first electrode of the seventh transistor is electrically connected with the initial signal terminal, and a second electrode of the seventh transistor is electrically connected with the fourth node.

A control electrode of the eighth transistor is electrically connected with the first control terminal, and a second electrode of the eighth transistor is electrically connected with the first node and a first electrode of the eighth transistor respectively.

A first terminal of the capacitor is connected with the first power terminal, and a second terminal of the capacitor is electrically connected with the first node.

In some possible implementation modes, the node control sub-circuit includes: two first transistors connected in series, two second transistors connected in series, a fourth transistor, a seventh transistor, an eighth transistor, and a capacitor, the drive sub-circuit includes: a third transistor, and the light emitting control sub-circuit includes: a fifth transistor and a sixth transistor.

A control electrode of a first transistor is electrically connected with the reset signal terminal, a first electrode of the first transistor is electrically connected with the initial signal terminal, and a second electrode of the first transistor is electrically connected with a first electrode of a second first transistor.

A control electrode of the second first transistor is electrically connected with the reset signal terminal, and a second electrode of the second first transistor is electrically connected with the first node.

A control electrode of a first second transistor is electrically connected with the scan signal terminal, a first electrode of the first second transistor is electrically connected with a second electrode of the eighth transistor, and a second electrode of the first second transistor is electrically connected with a first electrode of a second transistor.

A control electrode of the second transistor is electrically connected with the scan signal terminal, and a second electrode of the second transistor is electrically connected with the first node.

A control electrode of the third transistor is electrically connected with the first node, a first electrode of the third transistor is connected with the second node, and a second electrode of the third transistor is connected with the third node.

A control electrode of the fourth transistor is electrically connected with the scan signal terminal, a first electrode of the fourth transistor is electrically connected with the data signal terminal, and a second electrode of the fourth transistor is electrically connected with the third node.

A control electrode of the fifth transistor is electrically connected with the light emitting signal terminal, a first electrode of the fifth transistor is electrically connected with the first power terminal, and a second electrode of the fifth transistor is electrically connected with the third node.

A control electrode of the sixth transistor is electrically connected with the light emitting signal terminal, a first electrode of the sixth transistor is electrically connected with the second node, and a second electrode of the sixth transistor is electrically connected with the fourth node.

A control electrode of the seventh transistor is electrically connected with the second control terminal, a first electrode of the seventh transistor is electrically connected with the initial signal terminal, and a second electrode of the seventh transistor is electrically connected with the fourth node.

A control electrode of the eighth transistor is electrically connected with the first control terminal, and a first electrode of the eighth transistor is electrically connected with the second node and the second electrode of the eighth transistor respectively.

A first terminal of the capacitor is connected with the first power terminal, and a second terminal of the capacitor is electrically connected with the first node.

In some possible implementation modes, the second transistor and the eighth transistor have a same transistor type.

A width of a channel region of the eighth transistor is about 1 micron to 3 microns, and a length of the channel region of the eighth transistor is about 3 microns to 9 microns.

In some possible implementation modes, in the initialization stage, signals of the scan signal terminal and the first control terminal are mutually inverted signals.

In some possible implementation modes, a moment when the second control terminal is converted from a valid level signal to an invalid level signal is earlier than a moment when the light emitting signal terminal is converted from an invalid level signal to a valid level signal.

In some possible implementation modes, the second control terminal is a reset signal terminal or a scan signal terminal.

In some possible implementation modes, the light emitting element includes an organic light emitting diode.

An anode of the organic light emitting diode is electrically connected with the fourth node, and a cathode of the organic light emitting diode is electrically connected with the second power terminal.

In a second aspect, the present disclosure further provides a display apparatus, including: pixel drive circuits described above, arranged in an array.

In some possible implementation modes, a signal of a scan signal terminal of a pixel drive circuit in an i-th row is the same as a signal of a reset signal terminal of a pixel drive circuit in an (i+1)-th row, wherein i is a positive integer greater than or equal to 1 and smaller than M, and M is a total number of rows of the pixel drive circuits.

In a third aspect, the present disclosure further provides a drive method of a pixel drive circuit, configured to drive the pixel drive circuit described above, and the method includes: providing, by a node control sub-circuit, a signal of an initial signal terminal to a first node under control of a reset signal terminal, providing a signal of the initial signal terminal to a fourth node under control of a second control terminal, providing, by the node control sub-circuit, a signal of a second node to the first node and a signal of a data signal terminal to a third node under control of a scan signal terminal, and adjusting, by the node control sub-circuit, a signal of the first node or the second node under control of a first control terminal; providing, by a drive sub-circuit, a drive current to the second node under control of the first node and the third node; and providing, by a light emitting control sub-circuit, a signal of a first power terminal to the third node and a signal of the second node to the fourth node under control of a light emitting control terminal.

Other aspects may be understood upon reading and understanding drawings and detailed description.

BRIEF DESCRIPTION OF DRAWINGS

The accompanying drawings are used for providing understanding of technical solutions of the present disclosure, and constitute a part of the specification. They are used for explaining the technical solutions of the present disclosure together with the embodiments of the present disclosure, but do not constitute a limitation on the technical solutions of the present disclosure.

DETAILED DESCRIPTION

Figure 1:
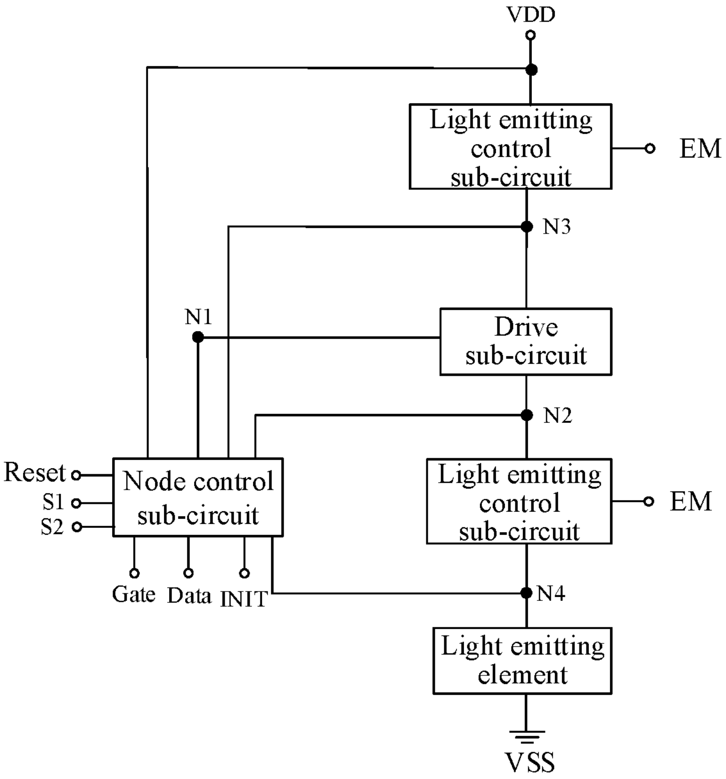
FIG. 1 is a schematic diagram of a structure of a pixel drive circuit according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed description about part of known functions and known components are omitted in the present disclosure. The drawings of the embodiments of the present disclosure only involve structures involved in the embodiments of the present disclosure, and for other structures, reference may be made to usual designs.

In the drawings, a size of each constituent element, a thickness of a layer, or a region is exaggerated sometimes for clarity. Therefore, one mode of the present disclosure is not necessarily limited to the size, and shapes and sizes of various components in the drawings do not reflect actual scales. In addition, the drawings schematically illustrate ideal examples, and one mode of the present disclosure is not limited to shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integral connection; it may be a mechanical connection or an electrical connection; it may be a direct mutual connection, or an indirect connection through middleware, or internal communication between two components. Those of ordinary skills in the art may understand specific meanings of these terms in the present disclosure according to specific situations.

In the specification, a transistor refers to an element which at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, a first electrode may be a source electrode, and a second electrode may be a drain electrode. In a case that transistors with opposite polarities are used, in a case that a direction of a current is changed during operation of a circuit, or the like, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include electrodes and wirings, but also include switching elements such as transistors, resistors, inductors, capacitors, other elements with various functions, etc.

In the specification, "parallel" refers to a state in which an angle formed by two straight lines is −10° or more and 100 or less, and thus also includes a state in which the angle is −5° or more and 5° or less. In addition, "perpendicular" refers to a state in which an angle formed by two straight lines is 800 or more and 1000 or less, and thus also includes a state in which the angle is 85° or more and 950 or less.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is not defined so strictly and numerical values within process and measurement error ranges are allowed.

An OLED display apparatus includes: multiple pixel units, and at least one pixel unit includes: a pixel drive circuit and a light emitting element, wherein the pixel drive circuit may drive the light emitting element to emit light. Some transistors in the pixel drive circuit have relatively large threshold voltage sensitivity, and even a slight change will cause threshold voltage drift, resulting in a relatively poor display effect of the OLED display apparatus. After simulation, it is found that a reason why some transistors have relatively large threshold voltage sensitivity is self-capacitance jump caused by turn-on and turn-off of the transistors, and a self-capacitance of a transistor is a unique property of a device, which cannot be changed.

FIG. 1 is a schematic diagram of a structure of a pixel drive circuit according to an embodiment of the present disclosure. As shown in FIG. 1, the pixel drive circuit according to the embodiment of the present disclosure is configured to drive a light emitting element to emit light, and includes: a node control sub-circuit, a light emitting control sub-circuit, and a drive sub-circuit. Among them, the node control sub-circuit is electrically connected with a first power terminal VDD, a reset signal terminal Reset, an initial signal terminal INIT, a first control terminal S1, a second control terminal S2, a scan signal terminal Gate, a data signal terminal Data, a first node N1, a second node N2, a third node N3, and a fourth node N4, respectively, and is configured to provide a signal of the initial signal terminal INIT to the first node N1 under control of the reset signal terminal Reset, provide a signal of the initial signal terminal INIT to the fourth node N4 under control of the second control terminal S2, provide a signal of the second node N2 to the first node N1 and provide a signal of the data signal terminal Data to the third node N3 under control of the scan signal terminal Gate, and adjust a signal of the first node N1 or the second node N2 under control of the first control terminal S1. The drive sub-circuit is electrically connected with the first node N1, the second node N2, and the third node N3, respectively, and is configured to provide a drive current to the second node N2 under control of the first node N1 and the third node N3. The light emitting control sub-circuit is electrically connected with a light emitting signal terminal EM, the first power terminal VDD, the second node N2, the third node N3, and the fourth node N4, respectively, and is configured to provide a signal of the first power terminal VDD to the third node N3 and provide a signal of the second node N2 to the fourth node N4 under control of the light emitting signal terminal EM.

In an exemplary embodiment, a working process of the pixel drive circuit may include: an initialization stage, a data writing stage, and a light emitting stage; wherein in the data writing stage and the light emitting stage, signals of the scan signal terminal Gate and the first control terminal S1 are mutually inverted signals.

In an exemplary embodiment, the light emitting element is electrically connected with the fourth node N4 and a second power terminal VSS, respectively.

In an exemplary embodiment, the first power terminal VDD continuously provides a high-level signal, and the second power terminal VSS continuously provides a low-level signal.

A pixel drive circuit according to an embodiment of the present disclosure is configured to drive a light emitting element to emit light, and includes: a node control sub-circuit, a light emitting control sub-circuit, and a drive sub-circuit; the node control sub-circuit is electrically connected with a first power terminal, a reset signal terminal, an initial signal terminal, a first control terminal, a second control terminal, a scan signal terminal, a data signal terminal, a first node, a second node, a third node, and a fourth node respectively, and is configured to provide a signal of the initial signal terminal to the first node under control of the reset signal terminal, provide a signal of the initial signal terminal to the fourth node under control of the second control terminal, provide a signal of the second node to the first node and provide a signal of the data signal terminal to the third node under control of the scan signal terminal, and adjust a signal of the first node or the second node under control of the first control terminal; the drive sub-circuit is electrically connected with the first node, the second node, and the third node respectively, and is configured to provide a drive current to the second node under control of the first node and the third node; the light emitting control sub-circuit is electrically connected with the light emitting control terminal, the first power terminal, the second node, the third node, and the fourth node respectively, and is configured to provide a signal of the first power terminal to the third node and provide a signal of the second node to the fourth node under control of the light emitting control terminal; and the light emitting element is electrically connected with the fourth node and a second power terminal respectively. In a data writing stage and a light emitting stage in the present disclosure, signals of a scan signal terminal Gate and a first control terminal S1 are mutually inverted signals, the node control sub-circuit is connected with the first control terminal and adjusts the signal of the first node or the second node under control of the first control terminal, which may reduce threshold voltage sensitivity of some transistors and reduce threshold voltage drift of some transistors, and may improve a display effect of an OLED display apparatus.

In an exemplary embodiment, the light emitting element may be an Organic Light Emitting Diode (OLED), including a first electrode (anode), an organic emitting layer, and a second electrode (cathode), which are stacked.

In an exemplary embodiment, the organic emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) that are stacked. In an exemplary implementation mode, hole injection layers of all sub-pixels may be a common layer connected together, electron injection layers of all the sub-pixels may be a common layer connected together, hole transport layers of all the sub-pixels may be a common layer connected together, electron transport layers of all the sub-pixels may be a common layer connected together, hole block layers of all the sub-pixels may be a common layer connected together, emitting layers of adjacent sub-pixels may be overlapped slightly or may be isolated from each other, and electron block layers of adjacent sub-pixels may be overlapped slightly or may be isolated from each other.

In an exemplary embodiment, an anode of an organic light emitting diode is electrically connected with a fourth node N4, and a cathode of the organic light emitting diode is electrically connected with a second power terminal VSS.

Figure 2:
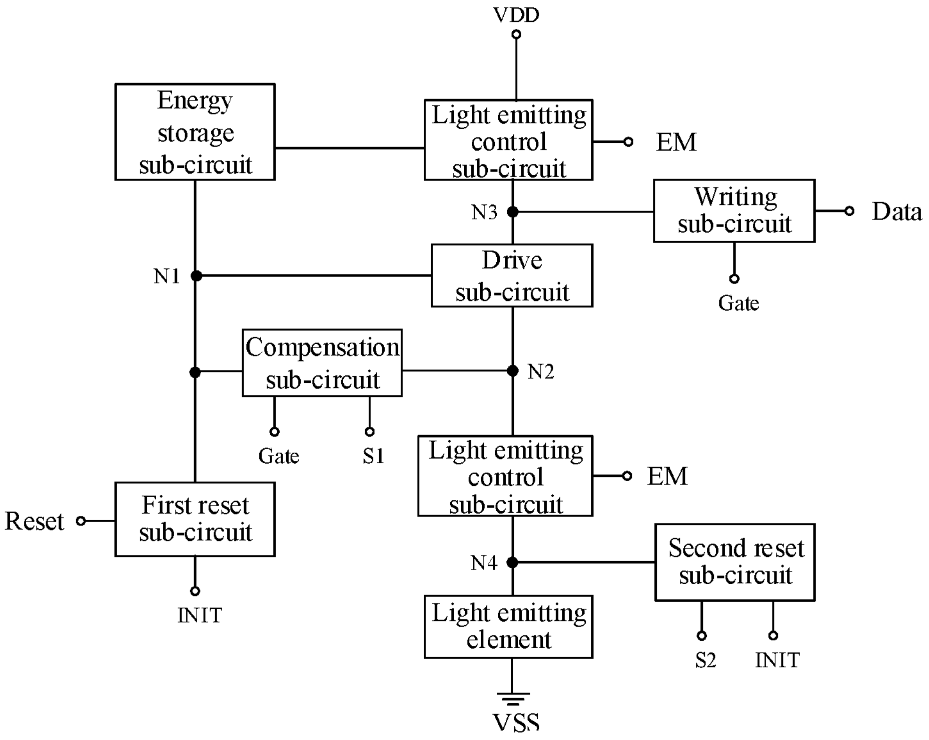
FIG. 2 is a schematic diagram of a structure of a node control sub-circuit according to an exemplary embodiment.

FIG. 2 is a schematic diagram of a structure of a node control sub-circuit according to an exemplary embodiment. As shown in FIG. 2, a node control sub-circuit in a pixel drive circuit provided by an exemplary embodiment may include: a first reset sub-circuit, a second reset sub-circuit, a compensation sub-circuit, a writing sub-circuit, and an energy storage sub-circuit. Among them, the first reset sub-circuit is electrically connected with a reset signal terminal Reset, an initial signal terminal INIT, and a first node N1 respectively, and is configured to provide a signal of the initial signal terminal INIT to the first node N1 under control of the reset signal terminal Reset. The second reset sub-circuit is electrically connected with a second control terminal S2, the initial signal terminal INIT, and a fourth node N4 respectively, and is configured to provide a signal of the initial signal terminal INIT to the fourth node N4 under control of the second control terminal S2. The compensation sub-circuit is electrically connected with a first control terminal S1, a scan signal terminal Gate, the first node N1, and a second node N2 respectively, and is configured to provide a signal of the second node N2 to the first node N1 under control of the scan signal terminal Gate, and adjust a signal of the first node N1 or the second node N2 under control of the first control terminal S1. The writing sub-circuit is electrically connected with the scan signal terminal Gate, a data signal terminal Data, and a third node N3 respectively, and is configured to provide a signal of the data signal terminal Data to the third node N3 under control of the scan signal terminal Gate. The energy storage sub-circuit is electrically connected with the first node N1 and a first power terminal VDD respectively, and is configured to store a voltage difference between the first node N1 and the first power terminal VDD.

Figure 3:
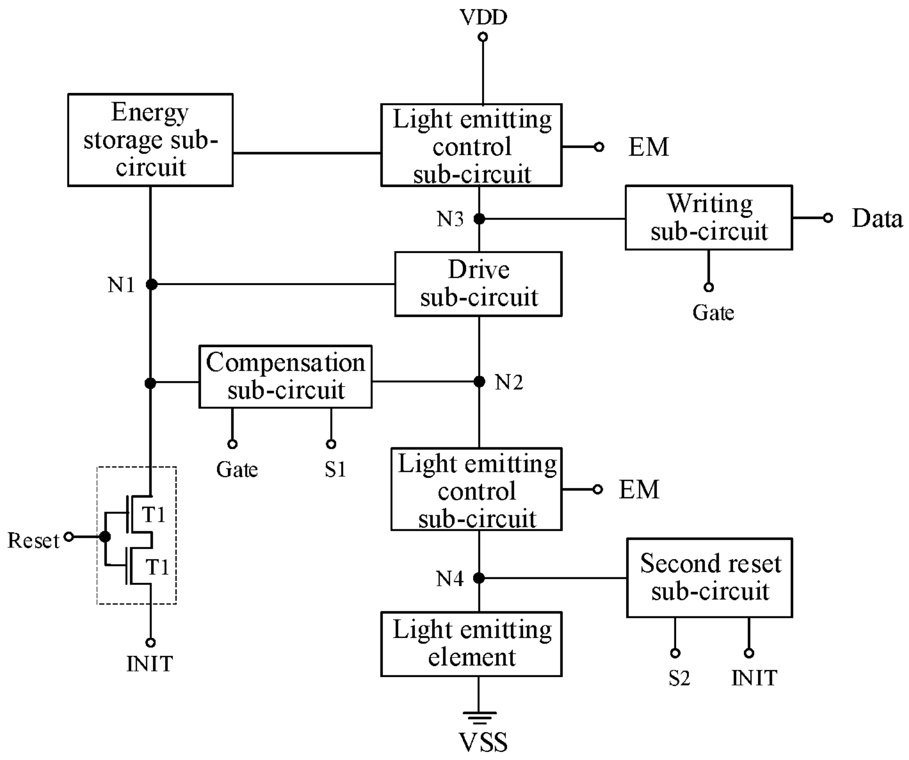
FIG. 3 is an equivalent circuit diagram of a first reset sub-circuit according to an exemplary embodiment.

FIG. 3 is an equivalent circuit diagram of a first reset sub-circuit according to an exemplary embodiment. As shown in FIG. 3, in an exemplary embodiment, a first reset sub-circuit may include: two first transistors T1 connected in series. Among them, a control electrode of a first transistor T1 is electrically connected with a reset signal terminal Reset, a first electrode of the first transistor T1 is electrically connected with an initial signal terminal INIT, and a second electrode of the first transistor T1 is electrically connected with a first electrode of a second first transistor T1; and a control electrode of the second first transistor T1 is electrically connected with the reset signal terminal Reset, and a second electrode of the second first transistor T1 is electrically connected with a first node N1.

In an exemplary embodiment, the first reset sub-circuit includes: two first transistors connected in series, which may reduce a leakage current of a pixel drive circuit, avoid abnormality of the pixel drive circuit when one of the first transistors fails to work normally, and improve reliability of the pixel drive circuit.

A first transistor is a reset transistor. When a signal of a reset signal terminal is a valid level signal, the first transistor T1 transmits an initialization voltage to the first node N1 to initialize a charge amount of the first node N1. Among them, the valid level signal refers to a signal that enables a transistor to be turned on.

FIG. 3 shows an exemplary structure of a first reset sub-circuit. A person skilled in the art may easily understand that an implementation mode of the first reset sub-circuit is not limited thereto, and the first reset sub-circuit may further include one first transistor, as long as a function thereof may be achieved.

Figure 4:
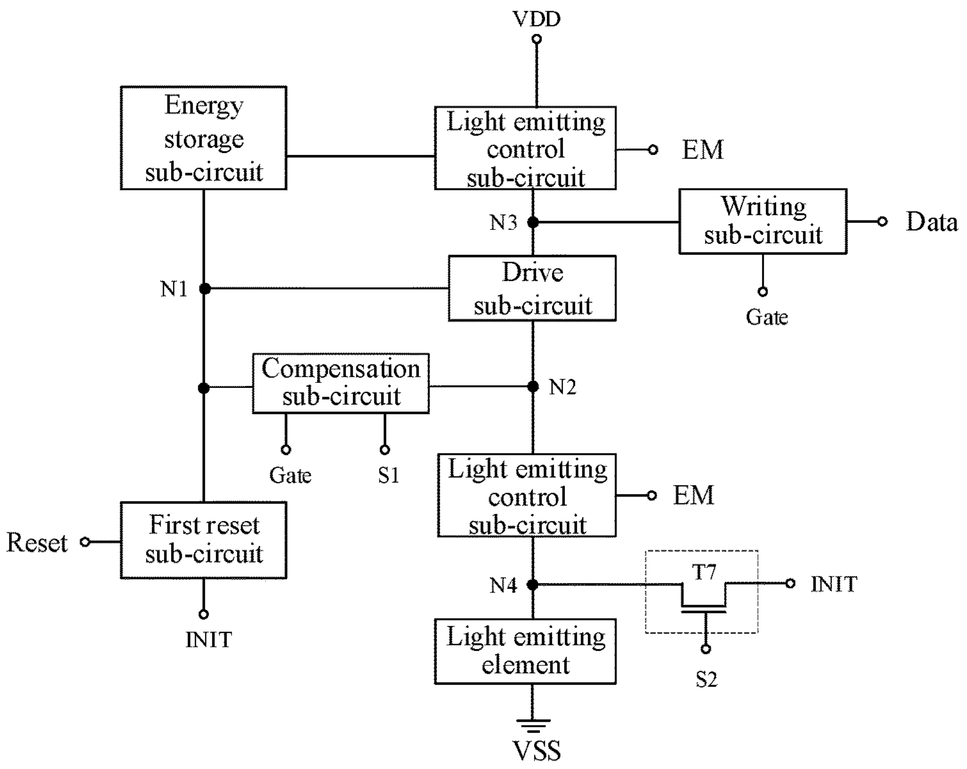
FIG. 4 is an equivalent circuit diagram of a second reset sub-circuit according to an exemplary embodiment.

FIG. 4 is an equivalent circuit diagram of a second reset sub-circuit according to an exemplary embodiment. As shown in FIG. 4, in an exemplary embodiment, a second reset sub-circuit may include: a seventh transistor T7. Among them, a control electrode of the seventh transistor T7 is electrically connected with a second control terminal S2, a first electrode of the seventh transistor T7 is electrically connected with an initial signal terminal INIT, and a second electrode of the seventh transistor T7 is electrically connected with a fourth node N4.

The seventh transistor is a reset transistor. When a signal of the second control terminal S2 is a valid level signal, the seventh transistor T7 transmits an initialization voltage to a first electrode of a light emitting element to initialize a charge amount accumulated in the first electrode of the light emitting element or release a charge amount accumulated in the first electrode of the light emitting element.

FIG. 4 shows an exemplary structure of the second reset sub-circuit. A person skilled in the art may easily understand that an implementation mode of the second reset sub-circuit is not limited thereto, as long as a function thereof may be achieved.

Figure 5:
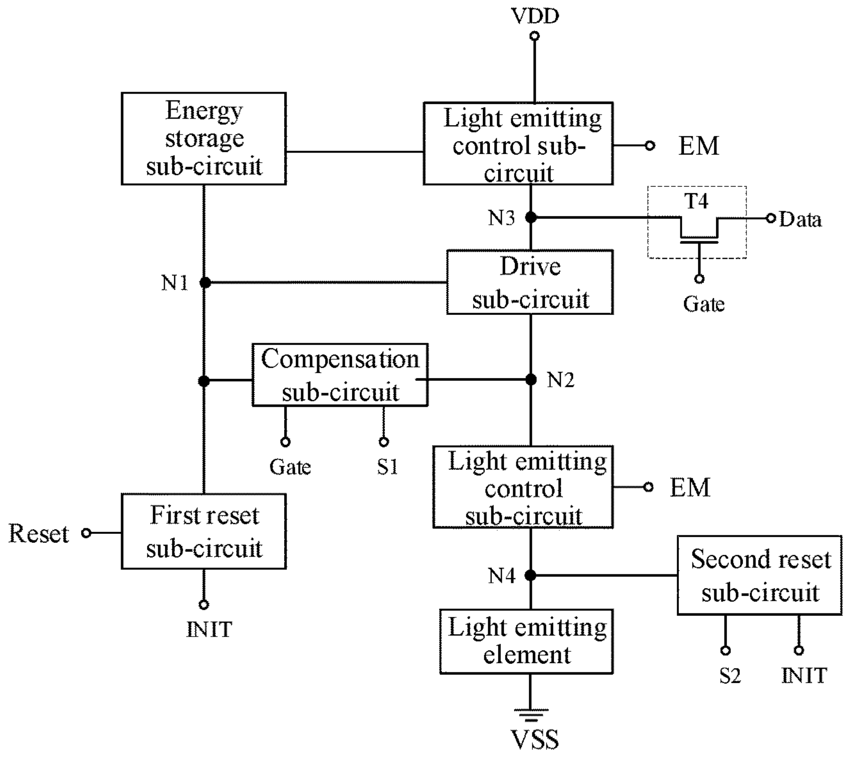
FIG. 5 is an equivalent circuit diagram of a writing sub-circuit according to an exemplary embodiment.

FIG. 5 is an equivalent circuit diagram of a writing sub-circuit according to an exemplary embodiment. As shown in FIG. 5, in an exemplary embodiment, a writing sub-circuit may include: a fourth transistor T4. Among them, a control electrode of the fourth transistor T4 is electrically connected with a scan signal terminal Gate, a first electrode of the fourth transistor T4 is electrically connected with a data signal terminal Data, and a second electrode of the fourth transistor T4 is electrically connected with a third node N3.

The fourth transistor T4 may be referred to as a switching transistor, a scan transistor, etc. When a signal of the scan signal terminal is a valid level signal, the fourth transistor T4 enables a data voltage of the data signal terminal to be input to a pixel drive circuit.

FIG. 5 shows an exemplary structure of the writing sub-circuit. A person skilled in the art may easily understand that an implementation mode of the writing sub-circuit is not limited thereto, as long as a function thereof may be achieved.

Figure 6:
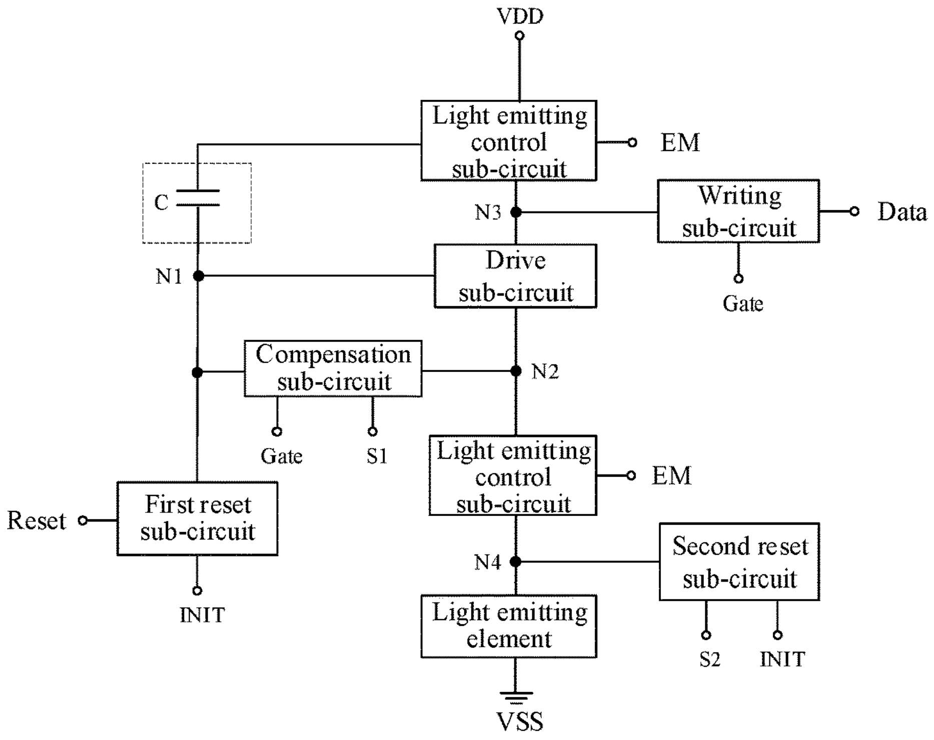
FIG. 6 is an equivalent circuit diagram of an energy storage sub-circuit according to an exemplary embodiment.

FIG. 6 is an equivalent circuit diagram of an energy storage sub-circuit according to an exemplary embodiment. As shown in FIG. 6, in an exemplary embodiment, an energy storage sub-circuit includes: a capacitor C. among them, a first terminal of the capacitor C is connected with a first power terminal VDD, and a second terminal of the capacitor C is electrically connected with a first node N1.

Figure 7:
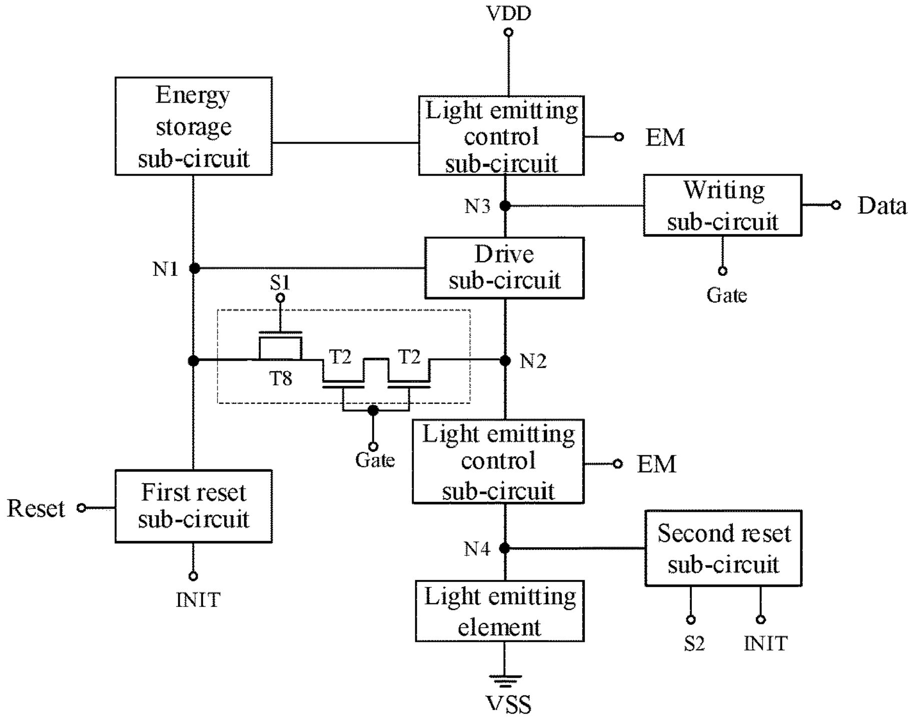
FIG. 7 is an equivalent circuit diagram of a compensation sub-circuit according to an exemplary embodiment.

FIG. 7 is an equivalent circuit diagram of a compensation sub-circuit according to an exemplary embodiment. As shown in FIG. 7, in an exemplary embodiment, a compensation sub-circuit may include: two second transistors T2 connected in series, and an eighth transistor T8. Among them, a control electrode of a first second transistor T2 is electrically connected with a scan signal terminal Gate, a first electrode of the first second transistor T2 is electrically connected with a second node N2, and a second electrode of the first second transistor T2 is electrically connected with a first electrode of a second transistor T2; a control electrode of the second transistor T2 is electrically connected with the scan signal terminal Gate, and a second electrode of the second transistor T2 is electrically connected with a first electrode of the eighth transistor T8; and a control electrode of the eighth transistor T8 is electrically connected with a first control terminal S1, and a second electrode of the eighth transistor T8 is electrically connected with a first node N1 and the first electrode of the eighth transistor T8 respectively.

Figure 8:
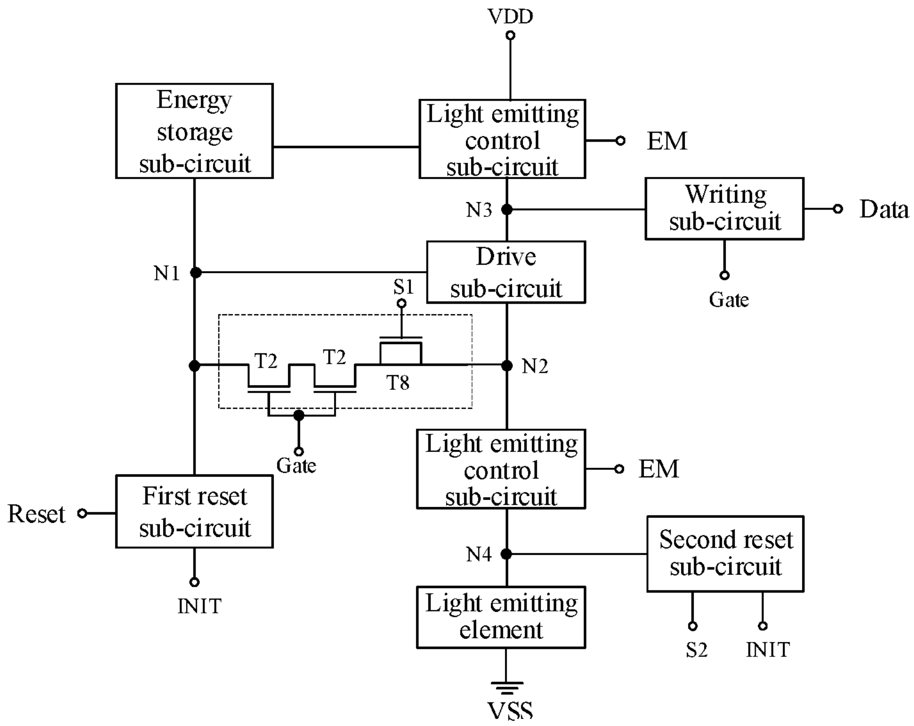
FIG. 8 is an equivalent circuit diagram of a compensation sub-circuit according to another exemplary embodiment.

FIG. 8 is an equivalent circuit diagram of a compensation sub-circuit according to another exemplary embodiment. As shown in FIG. 8, in an exemplary embodiment, a compensation sub-circuit may include: two second transistors T2 connected in series, and an eighth transistor T8. Among them, a control electrode of a first second transistor T2 is electrically connected with a scan signal terminal Gate, a first electrode of the first second transistor T2 is electrically connected with a second electrode of the eighth transistor T8, and a second electrode of the first second transistor T2 is electrically connected with a first electrode of a second transistor T2; a control electrode of the second transistor T2 is electrically connected with the scan signal terminal Gate, and a second electrode of the second transistor T2 is electrically connected with a first node N1; and a control electrode of the eighth transistor T8 is electrically connected with a first control terminal S1, and a first electrode of the eighth transistor T8 is electrically connected with a second node N2 and the second electrode of the eighth transistor T8 respectively.

A difference between FIG. 7 and FIG. 8 is that the eighth transistor in FIG. 7 is located between a second transistor and the first node, and the eighth transistor in FIG. 8 is located between a second transistor and the second node.

In an exemplary embodiment, as shown in FIG. 7 and FIG. 8, the first electrode and the second electrode of the eighth transistor being connected enables the eighth transistor to be functionally equivalent to a section of wire. When a signal of the scan signal terminal Gate is at a valid level, a second transistor T2 connects the first node N1 and the second node N2.

In an exemplary embodiment, the compensation sub-circuit includes: two second transistors connected in series, which may reduce a leakage current of a pixel drive circuit, avoid abnormality of the pixel drive circuit when one of the second transistors fails to work normally, and improve reliability of the pixel drive circuit.

FIG. 7 and FIG. 8 show an exemplary structure of the compensation sub-circuit. A person skilled in the art may easily understand that an implementation mode of the compensation sub-circuit is not limited thereto, as long as a function thereof may be achieved.

Figure 9:
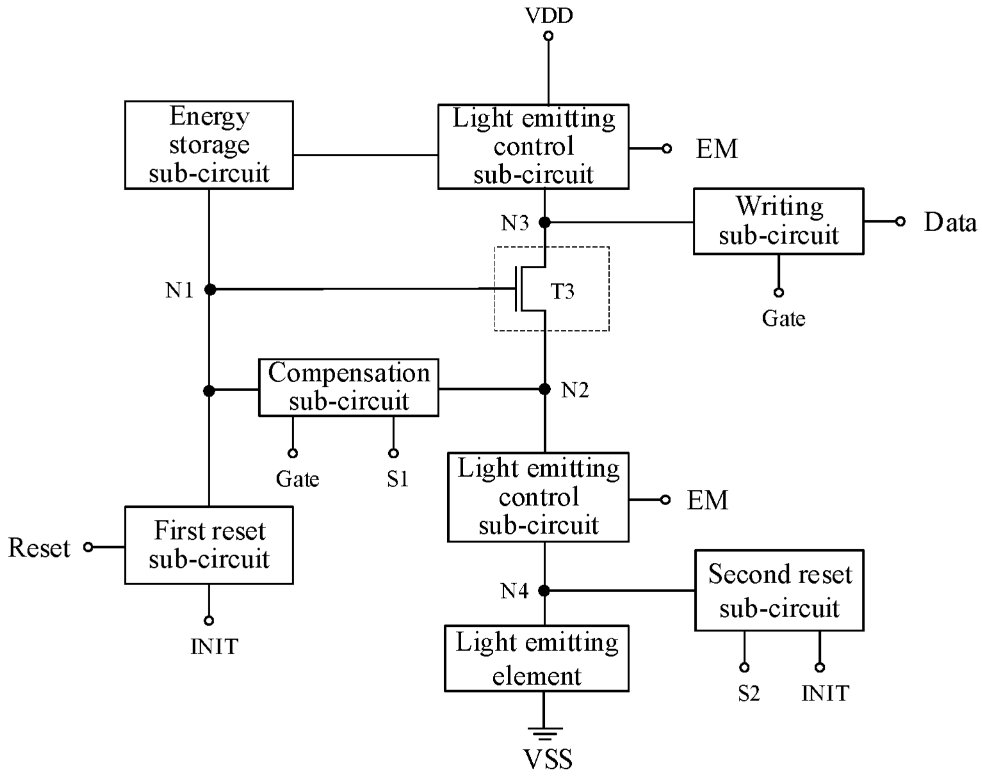
FIG. 9 is an equivalent circuit diagram of a drive sub-circuit according to an exemplary embodiment.

FIG. 9 is an equivalent circuit diagram of a drive sub-circuit according to an exemplary embodiment. As shown in FIG. 9, in an exemplary embodiment, a drive sub-circuit may include: a third transistor T3. Among them, a control electrode of the third transistor T3 is electrically connected with a first node N1, a first electrode of the third transistor T3 is connected with a second node N2, and a second electrode of the third transistor T3 is connected with a third node N3.

The third transistor T3 may be referred to as a drive transistor. The third transistor T3 determines a drive current flowing between a first power terminal VDD and a second power terminal VSS according to a potential difference between the control electrode and the first electrode of the third transistor T3.

Figure 10:
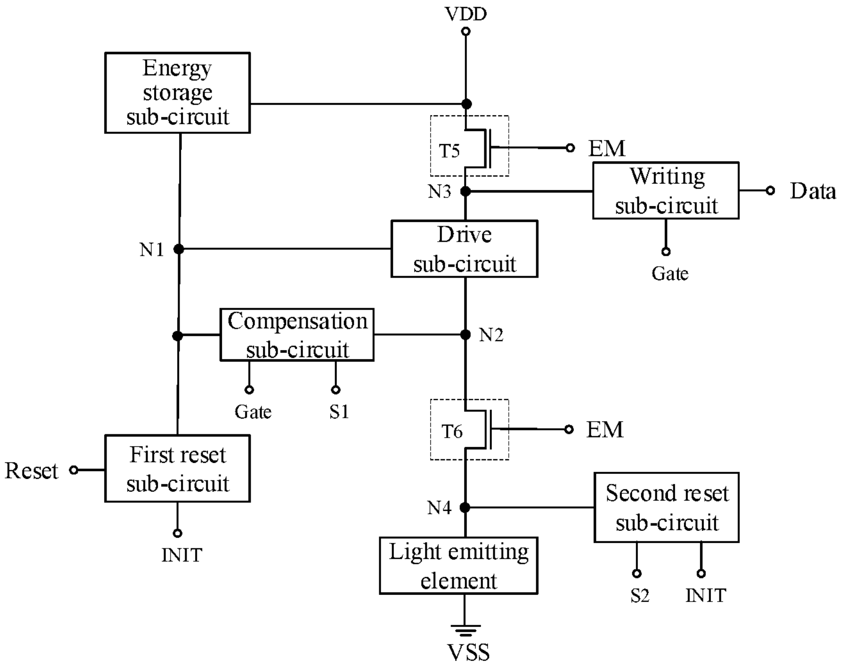
FIG. 10 is an equivalent circuit diagram of a light emitting control sub-circuit according to an exemplary embodiment.

FIG. 10 is an equivalent circuit diagram of a light emitting control sub-circuit according to an exemplary embodiment. As shown in FIG. 9, in an exemplary embodiment, a light emitting control sub-circuit may include: a fifth transistor T5 and a sixth transistor T6. Among them, a control electrode of the fifth transistor T5 is electrically connected with a light emitting signal terminal EM, a first electrode of the fifth transistor T5 is electrically connected with a first power terminal VDD, and a second electrode of the fifth transistor T5 is electrically connected with a third node N3; a control electrode of the sixth transistor T6 is electrically connected with the light emitting signal terminal EM, a first electrode of the sixth transistor T6 is electrically connected with a second node N2, and a second electrode of the sixth transistor T6 is electrically connected with a fourth node N4.

The fifth transistor T5 and the sixth transistor T6 may be referred to as light emitting transistors. When a signal of the light emitting signal terminal EM is a valid level signal, the fifth transistor T5 and the sixth transistor T6 enable a light emitting element to emit light by forming a drive current path between the first power terminal VDD and a second power terminal VSS.

FIG. 10 shows an exemplary structure of the light emitting control sub-circuit. A person skilled in the art may easily understand that an implementation mode of the light emitting control sub-circuit is not limited thereto, as long as a function thereof may be achieved.

Figure 11:
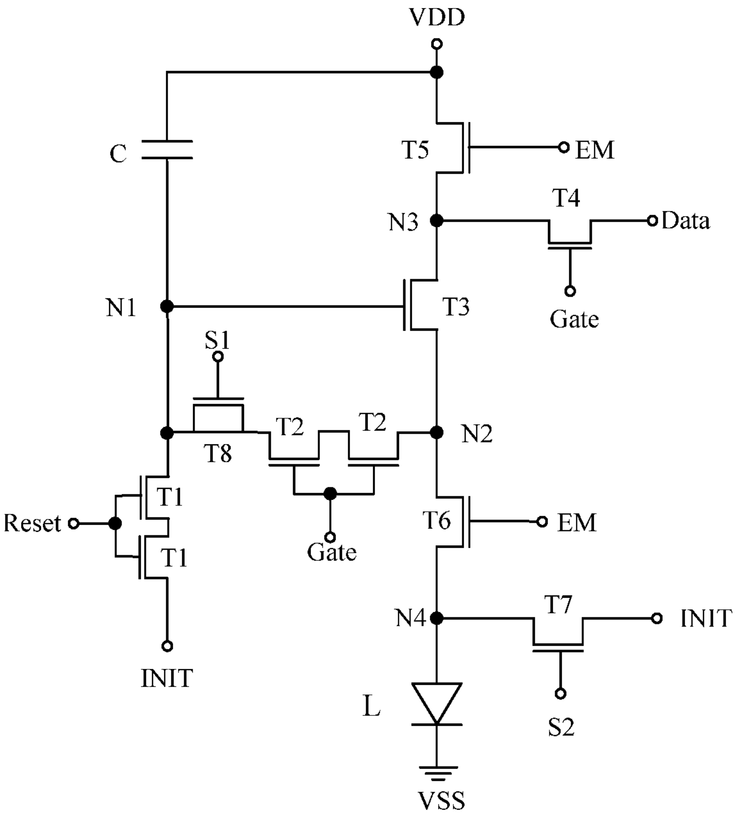
FIG. 11 is an equivalent circuit diagram of a pixel drive circuit according to an exemplary embodiment.

FIG. 11 is an equivalent circuit diagram of a pixel drive circuit according to an exemplary embodiment. As shown in FIG. 11, a node control sub-circuit in a pixel drive circuit according to an exemplary embodiment may include: two first transistors T1 connected in series, two second transistors T2 connected in series, a fourth transistor T4, a seventh transistor T7, an eighth transistor T8, and a capacitor; a drive sub-circuit may include: a third transistor T3; and a light emitting control sub-circuit may include: a fifth transistor T5 and a sixth transistor T6. A control electrode of a first transistor T1 is electrically connected with a reset signal terminal Reset, a first electrode of the first transistor T1 is electrically connected with an initial signal terminal INIT, and a second electrode of the first transistor T1 is electrically connected with a first electrode of a second first transistor T1; a control electrode of the second first transistor T1 is electrically connected with the reset signal terminal Reset, and a second electrode of the second first transistor T1 is electrically connected with a first node N1; a control electrode of a first second transistor T2 is electrically connected with a scan signal terminal Gate, a first electrode of the first second transistor T2 is electrically connected with a second node N2, and a second electrode of the first second transistor T2 is electrically connected with a first electrode of a second transistor T2; a control electrode of the second transistor T2 is electrically connected with the scan signal terminal Gate, and a second electrode of the second transistor T2 is electrically connected with a first electrode of the eighth transistor T8; a control electrode of the third transistor T3 is electrically connected with the first node N1, a first electrode of the third transistor T3 is connected with the second node N2, and a second electrode of the third transistor T3 is connected with a third node N3; a control electrode of the fourth transistor T4 is electrically connected with the scan signal terminal Gate, a first electrode of the fourth transistor T4 is electrically connected with a data signal terminal Data, and a second electrode of the fourth transistor T4 is electrically connected with the third node N3; a control electrode of the fifth transistor T5 is electrically connected with a light emitting signal terminal EM, a first electrode of the fifth transistor T5 is electrically connected with a first power terminal VDD, and a second electrode of the fifth transistor T5 is electrically connected with the third node N3; a control electrode of the sixth transistor T6 is electrically connected with the light emitting signal terminal EM, a first electrode of the sixth transistor T6 is electrically connected with the second node N2, and a second electrode of the sixth transistor T6 is electrically connected with a fourth node N4; a control electrode of the seventh transistor T7 is electrically connected with a second control terminal S2, a first electrode of the seventh transistor T7 is electrically connected with the initial signal terminal INIT, and a second electrode of the seventh transistor T7 is electrically connected with the fourth node N4; a control electrode of the eighth transistor T8 is electrically connected with a first control terminal S1, and a second electrode of the eighth transistor T8 is electrically connected with the first node N1 and the first electrode of the eighth transistor T8 respectively; and a first terminal of the capacitor C is connected with the first power terminal VDD, and a second terminal of the capacitor C is electrically connected with the first node N1.

Figure 12:
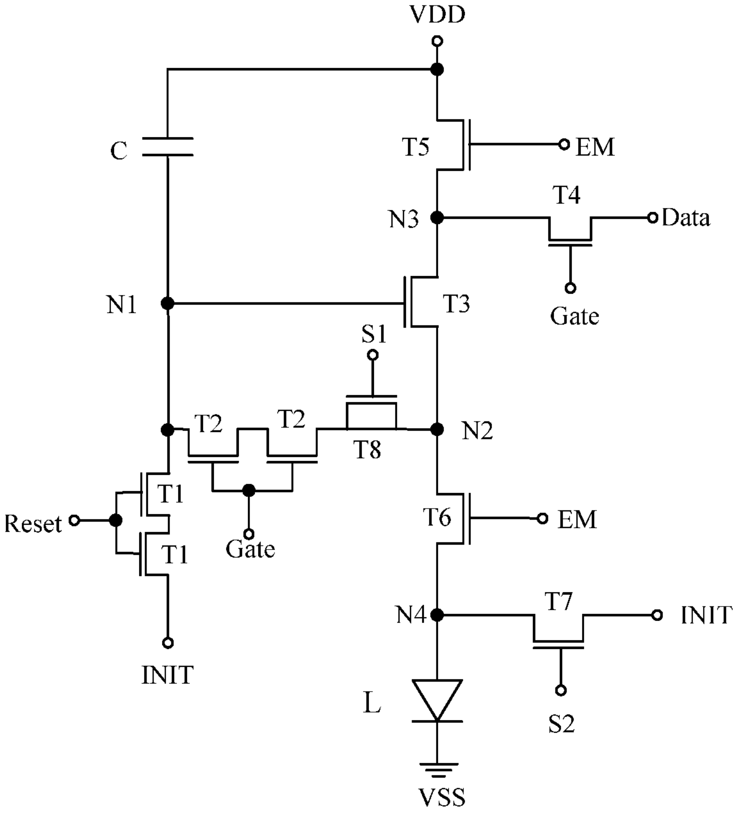
FIG. 12 is an equivalent circuit diagram of a pixel drive circuit according to another exemplary embodiment.

FIG. 12 is an equivalent circuit diagram of a pixel drive circuit according to another exemplary embodiment. As shown in FIG. 12, a node control sub-circuit in a pixel drive sub-circuit according to an exemplary embodiment may include: two first transistors T1 connected in series, two second transistors T2 connected in series, a fourth transistor T4, a seventh transistor T7, an eighth transistor T8, and a capacitor; a drive sub-circuit may include: a third transistor T3; and a light emitting control sub-circuit may include: a fifth transistor T5 and a sixth transistor T6. Among them, a control electrode of a first transistor T1 is electrically connected with a reset signal terminal Reset, a first electrode of the first transistor T1 is electrically connected with an initial signal terminal INIT, and a second electrode of the first first transistor T1 is electrically connected with a first electrode of a second first transistor T1; a control electrode of the second first transistor T1 is electrically connected with the reset signal terminal Reset, and a second electrode of the second first transistor T1 is electrically connected with a first node N1; a control electrode of a first second transistor T2 is electrically connected with a scan signal terminal Gate, a first electrode of the first second transistor T2 is electrically connected with a second electrode of the eighth transistor T8, and a second electrode of the first second transistor T2 is electrically connected with a first electrode of a second second transistor T2; a control electrode of the second second transistor T2 is electrically connected with the scan signal terminal Gate, and a second electrode of the second second transistor T2 is electrically connected with the first node N1; a control electrode of the third transistor T3 is electrically connected with the first node N1, a first electrode of the third transistor T3 is connected with a second node N2, and a second electrode of the third transistor T3 is connected with a third node N3; a control electrode of the fourth transistor T4 is electrically connected with the scan signal terminal Gate, a first electrode of the fourth transistor T4 is electrically connected with a data signal terminal Data, and a second electrode of the fourth transistor T4 is electrically connected with the third node N3; a control electrode of the fifth transistor T5 is electrically connected with a light emitting signal terminal EM, a first electrode of the fifth transistor T5 is electrically connected with a first power terminal VDD, and a second electrode of the fifth transistor T5 is electrically connected with the third node N3; a control electrode of the sixth transistor T6 is electrically connected with the light emitting signal terminal EM, a first electrode of the sixth transistor T6 is electrically connected with the second node N2, and a second electrode of the sixth transistor T6 is electrically connected with a fourth node N4; a control electrode of the seventh transistor T7 is electrically connected with a second control terminal S2, a first electrode of the seventh transistor T7 is electrically connected with the initial signal terminal INIT, and a second electrode of the seventh transistor T7 is electrically connected with the fourth node N4; a control electrode of the eighth transistor T8 is electrically connected with a first control terminal S1, and a first electrode of the eighth transistor T8 is electrically connected with the second node N2 and a second electrode of the eighth transistor T8 respectively; and a first terminal of a capacitor C is connected with the first power terminal VDD, and a second terminal of the capacitor C is electrically connected with the first node N1.

A difference between FIG. 11 and FIG. 12 lies in a position of the eighth transistor T8. The eighth transistor T8 in FIG. 11 is located between a second transistor T2 and the first node N1, and the eighth transistor in FIG. 12 is located between a second transistor T2 and the second node N2.

In an exemplary embodiment, the first transistor T1 to the eighth transistor T8 may be P-type transistors, or may be N-type transistors. The second transistor T2 and the eighth transistor T8 have a same transistor type. Use of a same type of transistors in a pixel drive circuit may simplify a process flow, reduce process difficulties of a display panel, and improve a product yield.

In an exemplary embodiment, the first transistor T1 to the eighth transistor T8 may include a P-type transistor and an N-type transistor.

In an exemplary embodiment, the first transistor T1 to the eighth transistor T8 may be low temperature poly silicon transistors.

In an exemplary embodiment, some transistors may be oxide transistors, and some transistors may be low temperature poly silicon transistors. An oxide transistor may reduce a leakage current and improve performance of a pixel drive circuit, and may reduce power consumption of the pixel drive circuit.

In an exemplary embodiment, a width of a channel region of the eighth transistor is about 1 micron to 3 microns, and a length of the channel region of the eighth transistor is about 3 microns to 9 microns. Exemplarily, the width of the channel region of the eighth transistor may be about 2 microns and the length of the channel region of the eighth transistor may be about 3 microns.

In an exemplary embodiment, in an initialization stage, signals of the scan signal terminal Gate and the first control terminal S1 may be identical or may be mutually inverted signals.

In an exemplary embodiment, a moment when a signal of the light emitting signal terminal EM is converted from an invalid level signal to a valid level signal may be the same as a moment when a signal of the scan signal terminal Gate is converted from a valid level signal to an invalid level signal, or later than the moment when the signal of the scan signal terminal Gate is converted from a valid level signal to an invalid level signal.

When the moment when the signal of the light emitting signal terminal EM is converted from the invalid level signal to the valid level signal may be the same as the moment when the signal of the scan signal terminal Gate is converted from the valid level signal to the invalid level signal, and signals of the scan signal terminal Gate and the first control terminal S1 are the same, the first control terminal S1 may be the light emitting signal terminal EM, and at this time, a signal line connected with the first control terminal S1 may be the same as a signal line connected with the light emitting signal terminal EM, which may reduce a quantity of signal lines connected with a pixel drive signal and achieve a narrow bezel.

When the signals of the scan signal terminal Gate and the first control terminal S1 are mutually inverted signals in the initialization stage, signals of the scan signal terminal Gate and the first control terminal S1 are mutually inverted signals in an entire working process of the pixel drive circuit.

In an exemplary embodiment, a signal of the reset signal terminal Reset is a valid level signal in the initialization stage, a signal of the scan signal terminal Gate is a valid level signal in a data writing stage, and signals of the light emitting signal terminal EM and the first control terminal S1 are valid level signals in a light emitting stage.

In an exemplary embodiment, in the data writing stage and the light emitting signal terminal, signals of the scan signal terminal Gate and the first control terminal S1 are mutually inverted signals, i.e., a moment when a signal of the first control terminal S1 is converted from an invalid level signal to a valid level signal is the same as a moment when a signal of the scan signal terminal Gate is converted from a valid level signal to an invalid level signal, that is to say, turn-on of the eighth transistor T8 occurs after turn-on of the second transistor T2.

Taking a case where the second transistor T2 and the eighth transistor T8 are P-type transistors as an example, a valid level signal is a low-level signal, an invalid level signal is a high-level signal, when a signal of the scan signal terminal Gate is converted from a valid level signal to an invalid level signal, a signal of the control electrode of the second transistor T2 is converted from a low-level signal to a high-level signal, at this time, due to an influence of a self-capacitance of the second transistor T2, voltage coupling between the first electrode and the second electrode of the second transistor T2 is raised, after this, a signal of the first control terminal S1 is converted from an invalid level signal to a valid level signal, that is, a signal of the control electrode of the eighth transistor T8 is converted from a high-level signal to a low-level signal, and due to an influence of a self-capacitance of the eighth transistor T8, voltages of the first electrode and the second electrode of the second transistor T2 are reduced, that is, the influence of the self-capacitance of the second transistor T2 is cancelled out, and threshold voltage sensitivity of the second transistor is reduced.

Taking a case where the second transistor T2 and the eighth transistor T8 are N-type transistors as an example, a valid level signal is a high-level signal, an invalid level signal is a low-level signal, when a signal of the scan signal terminal Gate is converted from a valid level signal to an invalid level signal, a signal of the control electrode of the second transistor T2 is converted from a high-level signal to a low-level signal, at this time, due to an influence of a self-capacitance of the second transistor T2, voltage coupling of the first electrode and the second electrode of the second transistor T2 is reduced, after this, a signal of the first control terminal S1 is converted from an invalid level signal to a valid level signal, that is, ae signal of the control electrode of the eighth transistor T8 is converted from a low-level signal to a high-level signal, and due to an influence of a self-capacitance of the eighth transistor T8, voltages of the first electrode and the second electrode of the second transistor T2 are raised, that is, the influence of the self-capacitance of the second transistor T2 is cancelled out, and threshold voltage sensitivity of the second transistor is reduced.

In an exemplary embodiment, a moment when a signal of the second control terminal S2 is converted from a valid level signal to an invalid level signal is earlier than a moment when a signal of the light emitting signal terminal EM is converted from an invalid level signal to a valid level signal. The moment when the signal of the second control terminal S2 is converted from the valid level signal to the invalid level signal is earlier than the moment when the signal of the light emitting signal terminal EM is converted from the invalid level signal to the valid level signal, which may ensure that the light emitting element emits light normally.

In an exemplary embodiment, the second control terminal S2 may be a reset signal terminal Reset or a scan signal terminal Gate. The second control terminal S2 may be the reset signal terminal Reset or the scan signal terminal Gate, which may reduce a quantity of signal lines connected with a pixel drive signal and may achieve a narrow bezel.

Figure 13:
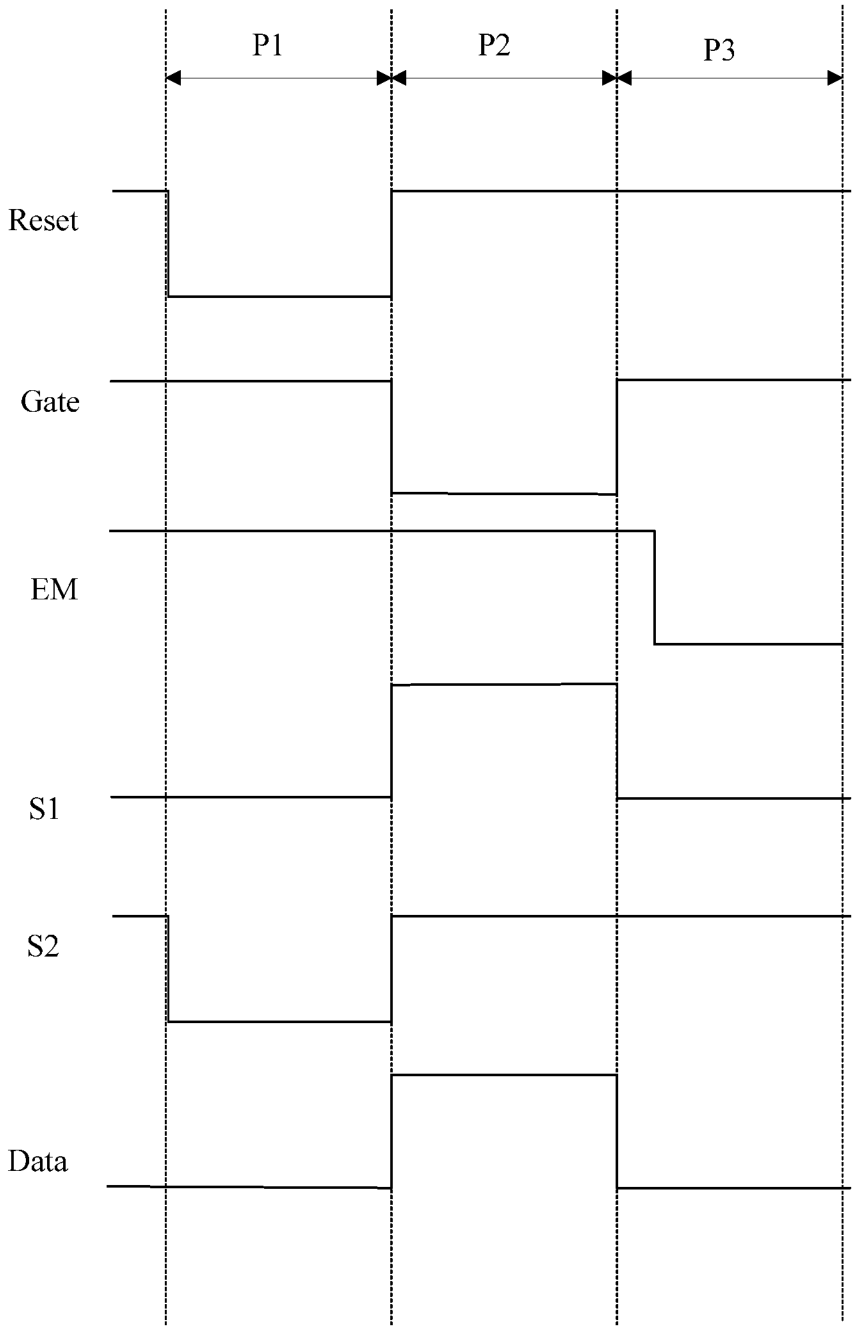
FIG. 13 is a first working timing diagram of a pixel drive circuit.
Figure 14:
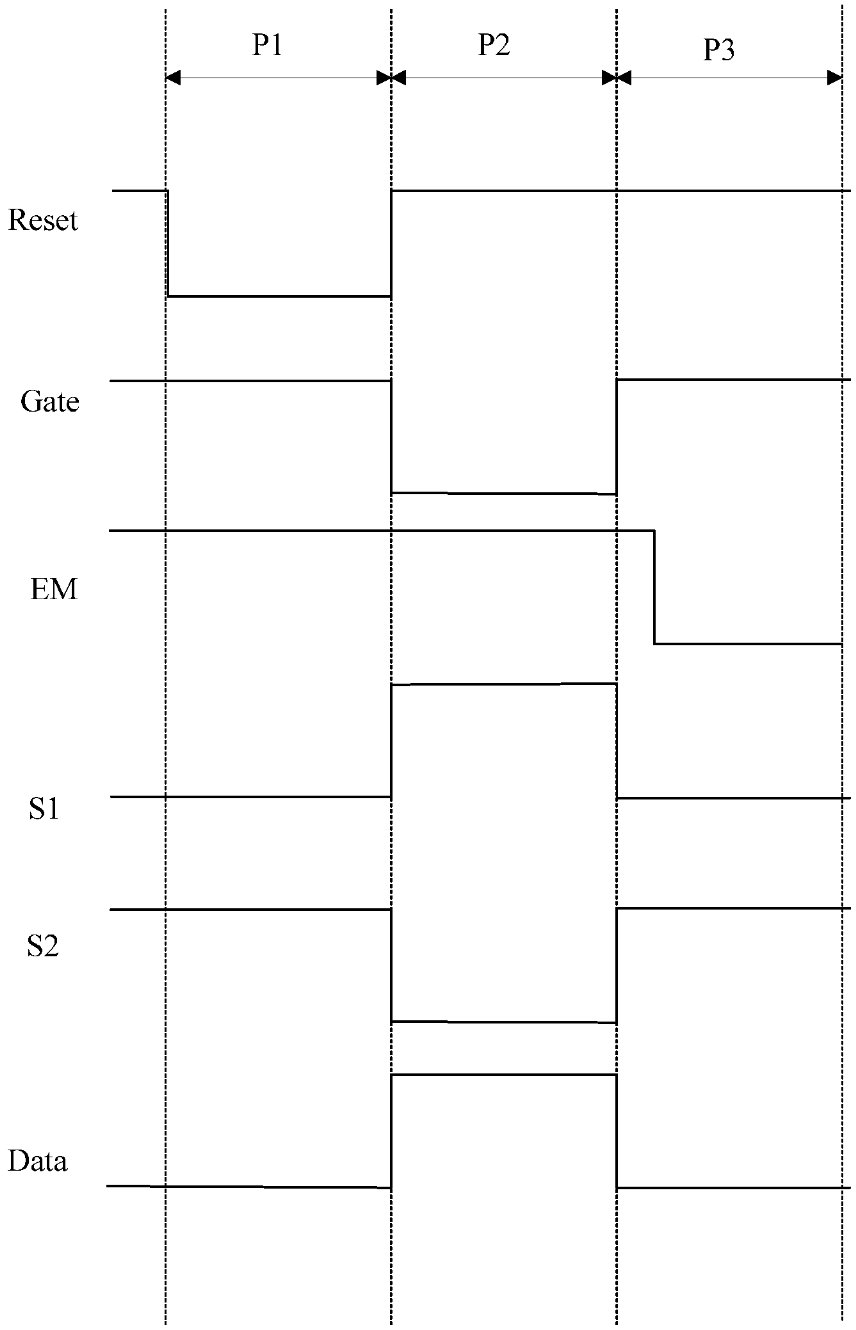
FIG. 14 is a second working timing diagram of a pixel drive circuit.
Figure 15:
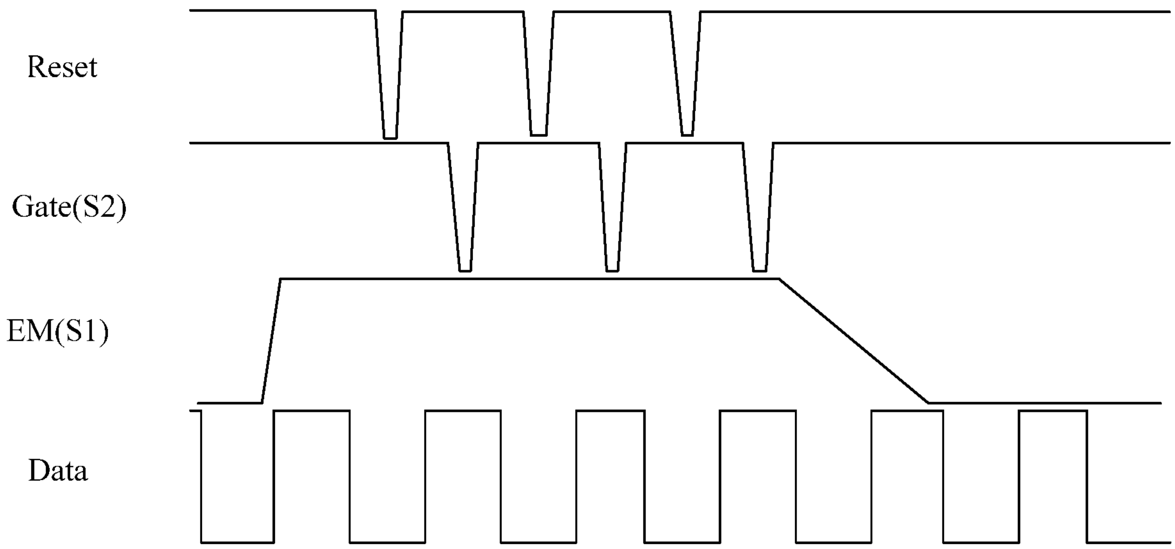
FIG. 15 is a simulation timing diagram of a pixel drive circuit.
Figure 17:
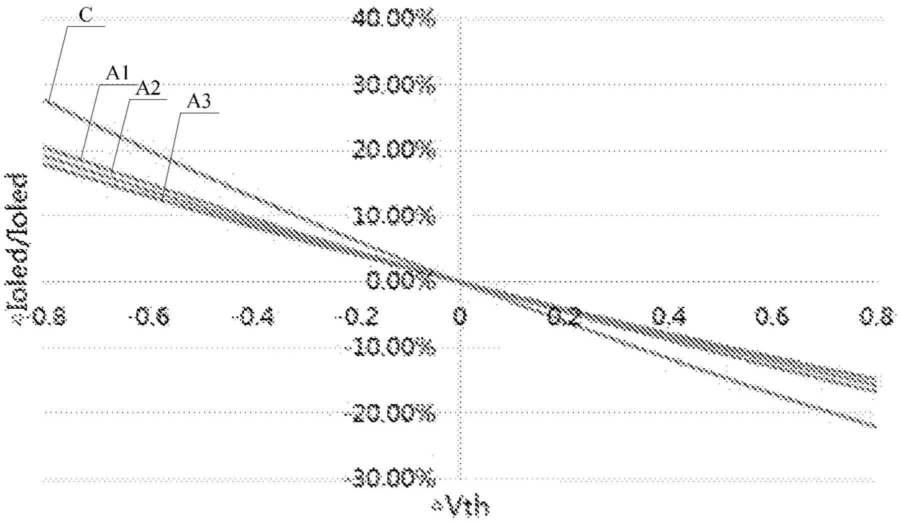
FIG. 17 is a first schematic diagram showing a change in a rate of change of drive currents of multiple pixel drive circuits with a size of a channel region of an eighth transistor.

FIG. 13 is a first working timing diagram of a pixel drive circuit, FIG. 14 is a second working timing diagram of a pixel drive circuit, and FIG. 15 is a simulation timing diagram of a pixel drive circuit. FIG. 13 and FIG. 14 are illustrated by taking a case where a moment when a signal of a light emitting signal terminal EM is converted from an invalid level signal to a valid level signal is later than a moment when a signal of a scan signal terminal Gate is converted from a valid level signal to an invalid level signal, and a signal of a first control terminal S1 and the signal of the scan signal terminal Gate are mutually inverted signals in an entire working process of the pixel drive circuit, as an example. FIG. 13 is illustrated by taking a case where a second control terminal S2 is a reset signal terminal Reset as an example. FIG. 14 is illustrated by taking a case where the second control terminal S2 is the scan signal terminal Gate as an example. FIG. 17 is illustrated by taking a case where the first control terminal S1 is the light emitting signal terminal EM, and the second control terminal S2 is the scan signal terminal Gate as an example.

An exemplary embodiment of the present disclosure is described below through a working process of the pixel drive circuit illustrated in FIG. 13. Since the first electrode and the second electrode of the eighth transistor T8 in FIG. 11 and FIG. 12 are connected, that is, the eighth transistor T8 is equivalent to a first section of wire, and working processes of FIG. 11 and FIG. 12 are the same. Taking a case where the first transistor T1 to the eighth transistor T8 are P-type transistors as an example, the pixel drive circuit in FIG. 11 and FIG. 12 includes the first transistor T1 to the eighth transistor T8, one capacitor C, and eight signal terminals (a data signal terminal Data, a scan signal terminal Gate, a reset signal terminal Reset, a light emitting signal terminal EM, an initial signal terminal INIT, a first control terminal S1, a second control terminal S2, a first power terminal VDD, and a second power terminal VSS). In an exemplary embodiment, the working process of the pixel drive circuit may include following stages.

In a first stage P1, which is referred to as an initialization stage, signals of the light emitting signal terminal EM and the scan signal terminal Gate are all high-level signals, and signals of the first control terminal S1, the reset signal terminal Reset, and the second control terminal S2 are low-level signals. A signal of the reset signal terminal Reset is a low-level signal, the first transistor T1 is turned on, a signal of the initial signal terminal INIT is provided to a first node N1, the seventh transistor T7 is turned on, an initial voltage of the initial signal terminal INIT is provided to a fourth node N4, a first electrode of a light emitting element L is initialized (reset), a pre-stored voltage inside the light emitting element L is cleared up, and initialization is completed to ensure that the light emitting element L does not emit light. A signal of the first control terminal S1 is a low-level signal, the eighth transistor T8 is turned on, the signals of the scan signal terminal Gate and the light emitting signal terminal EM are high-level signals, and the second transistor T2, the fourth transistor T4, the fifth transistor T5, and the sixth transistor T6 are turned off. The light emitting element L does not emit light in this stage.

In a second stage P2, which is referred to as a data writing stage or a threshold compensation stage, signals of the reset signal terminal Reset, the light emitting signal terminal EM, the first control terminal S1, and the second control terminal S2 are high-level signals, a signal of the scan signal terminal Gate is a low-level signal, and the data signal terminal Data outputs a data voltage. In this stage, since the first node N1 is a low-level signal, the third transistor T3 is turned on. The signal of the scan signal terminal Gate is the low-level signal, and the second transistor T2 and the fourth transistor T4 are turned on. The second transistor T2 and the fourth transistor T4 enable the data voltage output by the data signal terminal Data to be provided to the first node N1 through a third node N3, the turned-on third transistor T3, a second node N2, the turned-on second transistor T2, the fourth node N4 and the eighth transistor T8, and a difference between the data voltage output by the data signal terminal Data and a threshold voltage of the third transistor T3 is charged into the capacitor C until a voltage of the first node N1 is Vd−|Vth|, wherein Vd is the data voltage output by the data signal terminal Data, and Vth is the threshold voltage of the third transistor T3. Signals of the reset signal terminal Reset and the second control terminal S2 are high-level signals, and the first transistor T1 and the seventh transistor T7 are turned off. A signal of the light emitting signal terminal EM is a high-level signal, and the fifth transistor T5 and the sixth transistor T6 are turned off. The light emitting element L does not emit light in this stage.

In a third stage P3, which is referred to as a light emitting stage, signals of the first control terminal S1 and the light emitting signal terminal EM are all low-level signals, and signals of the reset signal terminal Reset, the scan signal terminal Gate, and the second control terminal S2 are high-level signals. Signals of the reset signal terminal Reset and the second control terminal S2 are low-level signals, and the first transistor T1 and the seventh transistor T7 are turned off. A signal of the scan signal terminal Gate is a high-level signal, the second transistor T2 and the fourth transistor T4, and a signal of the first control terminal S1 is a low-level signal, the eighth transistor T8 is turned on, and a signal of the control electrode of the eighth transistor T8 is converted from a high-level signal to a low-level signal, due to an influence of a self-capacitance of the eighth transistor T8, a voltage increased by coupling the first electrode and the second electrode of the second transistor T2, due to an influence of a self-capacitance of the second transistor T2 when a signal of the control electrode of the second transistor T2 is converted from a low-level signal to a high-level signal, is reduced, that is, the influence of the self-capacitance of the second transistor T2 is cancelled out, and threshold voltage sensitivity of the second transistor is reduced. A signal of the light emitting signal terminal EM is a low-level signal, the fifth transistor T5 and the sixth transistor T6 are turned on, and a power supply voltage output by the first power terminal VDD provides a drive voltage to the first electrode of the light emitting element L through the turned-on fifth transistor T5, the third transistor T3, and the sixth transistor T6 to drive the light emitting element L to emit light.

In a drive process of the pixel drive circuit, a drive current flowing through the third transistor T3 (a drive transistor) is determined by a voltage difference between the control electrode and the first electrode. Since the voltage of the first node N1 is Vd−|Vth|, the drive current of the third transistor T3 is as follows.

$$I = K*(Vgs - Vth)^2 = K*[(Vdd - Vd + |Vth|) - Vth]^2 = K*[(Vdd - Vd]^2$$

Among them, I is the drive current flowing through the third transistor T3, i.e., the drive current for driving an OLED, K is a constant, Vgs is the voltage difference between the control electrode and the first electrode of the third transistor T3, Vth is the threshold voltage of the third transistor T3, Vd is the data voltage output by the data signal terminal Data, and Vdd is the power supply voltage output by the first power terminal VDD.

An exemplary embodiment of the present disclosure is described below through a working process of the pixel drive circuit illustrated in FIG. 14. Since the first electrode and the second electrode of the eighth transistor T8 in FIG. 11 and FIG. 12 are connected, that is, the eighth transistor T8 is equivalent to a first section of wire, and working processes in FIG. 11 and FIG. 12 are the same. Taking a case where the first transistor T1 to the eighth transistor T8 are P-type transistors as an example, the pixel drive circuit in FIG. 11 and FIG. 12 includes the first transistor T1 to the eighth transistor T8, one capacitor C, and eight signal terminals (a data signal terminal Data, a scan signal terminal Gate, a reset signal terminal Reset, a light emitting signal terminal EM, an initial signal terminal INIT, a first control terminal S1, a second control terminal S2, a first power terminal VDD, and a second power terminal VSS). In an exemplary embodiment, the working process of the pixel drive circuit may include following stages.

In a first stage P1, which is referred to as an initialization stage, signals of the light emitting signal terminal EM, the scan signal terminal Gate, and the second control terminal S2 are all high-level signals, and signals of the reset signal terminal Reset and the first control terminal S1 are low-level signals. A signal of the reset signal terminal Reset is a low-level signal, the first transistor T1 is turned on, and a signal of the initial signal terminal INIT is provided to a first node N1. A signal of the second control terminal S2 is a high-level signal, the seventh transistor T7 is turned off, a signal of the first control terminal S1 is a low-level signal, the eighth transistor T8 is turned on, signals of the scan signal terminal Gate and the light emitting signal terminal EM are high-level signals, and the second transistor T2, the fourth transistor T4, the fifth transistor T5, and the sixth transistor T6 are turned off. A light emitting element L does not emit light in this stage.

In a second stage P2, which is referred to as a data writing stage or a threshold compensation stage, signals of the reset signal terminal Reset, the light emitting signal terminal EM, and the first control terminal S1 are high-level signals, signals of the scan signal terminal Gate and the second control terminal S2 are low-level signals, and the data signal terminal Data outputs a data voltage. In this stage, since the first node N1 is a low-level signal, the third transistor T3 is turned on. A signal of the second control terminal S2 is a low-level signal, the seventh transistor T7 is turned on, an initial voltage of the initial signal terminal INIT is provided to a fourth node N4, a first electrode of the light emitting element L is initialized (reset), a pre-stored voltage inside the light emitting element L is cleared up, and initialization is completed to ensure that the light emitting element L does not emit light. A signal of the scan signal terminal Gate is a low-level signal, and the second transistor T2 and the fourth transistor T4 are turned on. The second transistor T2 and the fourth transistor T4 enable the data voltage output by the data signal terminal Data to be provided to the first node N1 through a third node N3, the turned-on third transistor T3, a second node N2, the turned-on second transistor T2, the fourth node N4, and the eighth transistor T8, and a difference between the data voltage output by the data signal terminal Data and a threshold voltage of the third transistor T3 is charged into the capacitor C, until a voltage of the first node N1 is Vd−|Vth|, wherein Vd is the data voltage output by the data signal terminal Data, and Vth is the threshold voltage of the third transistor T3. Signals of the reset signal terminal Reset and the second control terminal S2 are high-level signals, and the first transistor T1 and the seventh transistor T7 are turned off. A signal of the light emitting signal terminal EM is a high-level signal, and the fifth transistor T5 and the sixth transistor T6 are turned off. The light emitting element L does not emit light in this stage.

In a third stage P3, which is referred to as a light emitting stage, signals of the first control terminal S1 and the light emitting signal terminal EM are all low-level signals, and signals of the reset signal terminal Reset, the scan signal terminal Gate, and the second control terminal S2 are high-level signals. Signals of the reset signal terminal Reset and the second control terminal S2 are low-level signals, and the first transistor T1 and the seventh transistor T7 are turned off. A signal of the scan signal terminal Gate is a high-level signal, the second transistor T2 and the fourth transistor T4, and a signal of the first control terminal S1 is a low-level signal, the eighth transistor T8 is turned on, a signal of the control electrode of the eighth transistor T8 is converted from a high-level signal to a low-level signal, due to an influence of a self-capacitance of the eighth transistor T8, a voltage increased by coupling the first electrode and the second electrode of the second transistor T2, due to an influence of a self-capacitance of the second transistor T2 when a signal of the control electrode of the second transistor T2 is converted from a low-level signal to a high-level signal, is reduced, that is, the influence of the self-capacitance of the second transistor T2 is cancelled out, and threshold voltage sensitivity of the second transistor is reduced. A signal of the light emitting signal terminal EM is a low-level signal, the fifth transistor T5 and the sixth transistor T6 are turned on, and a power supply voltage output by the first power terminal VDD provides a drive voltage to the first electrode of the light emitting element L through the turned-on fifth transistor T5, the third transistor T3, and the sixth transistor T6 to drive the light emitting element L to emit light.

In a drive process of the pixel drive circuit, a drive current flowing through the third transistor T3 (a drive transistor) is determined by a voltage difference between the control electrode and the first electrode. Since the voltage of the first node N1 is Vd−|Vth|, the drive current of the third transistor T3 is as follows.

$$I = K*(Vgs - Vth)^2 = K*[(Vdd - Vd + |Vth|) - Vth]^2 = K*[(Vdd - Vd]^2$$

Among them, I is the drive current flowing through the third transistor T3, i.e., the drive current for driving an OLED, K is a constant, Vgs is the voltage difference between the control electrode and the first electrode of the third transistor T3, Vth is the threshold voltage of the third transistor T3, Vd is the data voltage output by the data signal terminal Data, and Vdd is the power supply voltage output by the first power terminal VDD.

In an exemplary embodiment, the working process of the pixel drive circuit may include at least one first stage and at least one second stage. The working process of the pixel drive circuit of FIG. 13 to FIG. 14 is illustrated by taking one first stage and one second stage as an example. FIG. 15 is illustrated by taking three first stages and three second stages as an example, which is not limited in the present disclosure.

Since the first electrode and the second electrode of the eighth transistor T8 are connected, in the light emitting stage, a voltage of a first node of the pixel drive circuit provided in FIG. 11 and FIG. 12 is the same as a voltage of a first node of a pixel drive circuit including only the first transistor to the seventh transistor, that is, the pixel drive circuit provided in FIG. 11 and FIG. 12 has a same flicker degree as the pixel drive circuit including only the first transistor to the seventh transistor, thus, addition of the eighth transistor will not cause poor display brightness.

Figure 16:
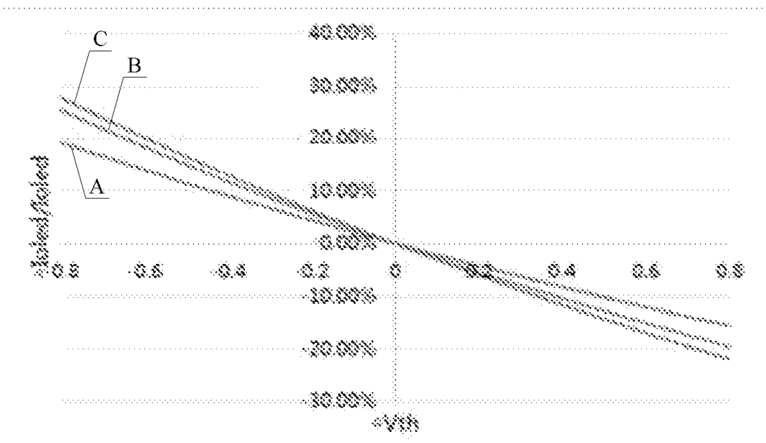
FIG. 16 is a diagram of comparison between multiple pixel drive circuits.

FIG. 16 is a diagram of comparison between multiple pixel drive circuits. An abscissa in FIG. 16 is a threshold voltage drift amount of a second transistor, and an ordinate is a rate of change of a drive current, wherein the rate of change of the drive current is equal to a ratio of a difference between a drive current when a threshold voltage of the second transistor does not drift and a drive current when the threshold voltage of the second transistor drifts to the drive current when the threshold voltage of the second transistor does not drift, and the rate of change of the drive current may represent sensitivity of the threshold voltage of the second transistor. In FIG. 16, A refers to the pixel drive circuit shown in FIG. 11, B refers to the pixel drive circuit shown in FIG. 12, and C refers to a pixel drive circuit including only the first transistor to the seventh transistor.

As shown in FIG. 16, for a threshold voltage drift amount of a same second transistor, a rate of change of a drive current of the pixel drive circuit A is smaller than a rate of change of a drive current of the pixel drive circuit B, and the rate of change of the drive current of the pixel drive circuit B is smaller than a rate of change of a drive current of the pixel drive circuit C, that is, sensitivity of a threshold voltage of a second transistor in the pixel drive circuit A is smaller than sensitivity of a threshold voltage of the pixel drive circuit B, and the sensitivity of the threshold voltage of the pixel drive circuit B is smaller than sensitivity of a threshold voltage of the pixel drive circuit C. A display effect of a display apparatus where the pixel drive circuit A is located is better than a display effect of a display apparatus where the pixel drive circuit B is located.

Since the sensitivity of the threshold voltage of the pixel drive circuit provided in FIG. 11 is relatively small, a size of a channel region of the eighth transistor in the pixel drive circuit provided in FIG. 11 is now analyzed. FIG. 17 is a first schematic diagram showing a change in a rate of change of drive currents of multiple pixel drive circuits with a size of a channel region of an eighth transistor. In FIG. 17, an abscissa is a threshold voltage drift amount of a second transistor, and an ordinate is a rate of change of a drive current. In FIG. 17, A1 refers to the pixel drive circuit shown in FIG. 11 in which a width W of a channel region of an eighth transistor is 1 micron, a length L of the channel region of the eighth transistor is 3 microns, and a width-to-length ratio W/L of the channel region of the eighth transistor is ⅓; A2 refers to the pixel drive circuit shown in FIG. 11 in which the width W of the channel region of the eighth transistor is 2 microns, the length L of the channel region of the eighth transistor is 3 microns, and the width-to-length ratio W/L of the channel region of the eighth transistor is equal to ⅔; A3 refers to the pixel drive circuit shown in FIG. 11 in which the width W of the channel region of the eighth transistor is 3 microns, the length L of the channel region of the eighth transistor is 3 microns, and the width-to-length ratio W/L of the channel region of the eighth transistor is equal to 3/3; and C refers to the pixel drive circuit including only the first transistor to the seventh transistor. As shown in FIG. 17, lengths L of channel regions of eighth transistors of the pixel drive circuit A1, the pixel drive circuit A2, and the pixel drive circuit A3 in FIG. 17 are the same, and with increase of a width W of a channel region of an eighth transistor, a rate of change of a drive current of a pixel drive circuit is smaller, i.e., the sensitivity of the threshold voltage of the second transistor is smaller. That is, for the pixel drive circuit shown in FIG. 11, under a state in which the length L of the channel region of the eighth transistor is the same when the width-to-length ratio of the channel region of the eighth transistor is about 1/3 to 3/3, the larger the width W of the channel region of the eighth transistor is, the lower the sensitivity of the threshold voltage of the second transistor is, and the better the improvement to the sensitivity of the threshold voltage of the second transistor is.

Figure 18:
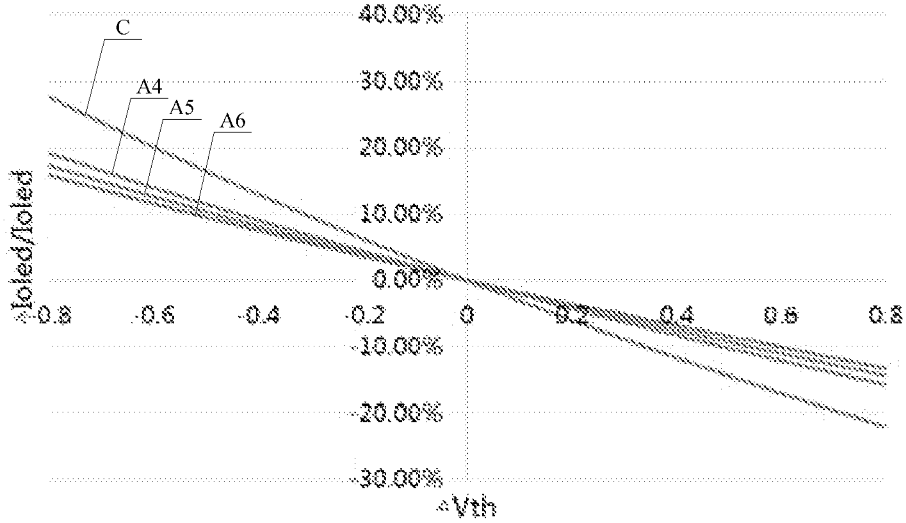
FIG. 18 is a second schematic diagram showing a change in a rate of change of drive currents of multiple pixel drive circuits with a size of a channel region of an eighth transistor.

FIG. 18 is a second schematic diagram showing a change in a rate of change of drive currents of multiple pixel drive circuits with a size of a channel region of an eighth transistor. In FIG. 18, an abscissa is a threshold voltage drift amount of a second transistor, and an ordinate is a rate of change of a drive current. In FIG. 18, A4 refers to the pixel drive circuit shown in FIG. 11 in which a width W of a channel region of an eighth transistor is 2 micron, a length L of the channel region of the eighth transistor is 3 microns, and a width-to-length ratio W/L of the channel region of the eighth transistor is equal to 2/3; A5 refers to the pixel drive circuit shown in FIG. 11 in which the width W of the channel region of the eighth transistor is 2 microns, the length L of the channel region of the eighth transistor is 6 microns, and the width-to-length ratio W/L of the channel region of the eighth transistor is equal to 2/6; A6 refers to the pixel drive circuit shown in FIG. 11 in which the width W of the channel region of the eighth transistor is 2 microns, the length L of the channel region of the eighth transistor is 9 microns, and the width-to-length ratio W/L of the channel region of the eighth transistor is equal to 2/9; and C refers to the pixel drive circuit including only the first transistor to the seventh transistor. As shown in FIG. 18, widths W of channel regions of eighth transistors of the pixel drive circuit A4, the pixel drive circuit A5, and the pixel drive circuit A6 in FIG. 18 are the same, and with increase of a length L of a channel region of an eighth transistor, a rate of change of a drive current of a pixel drive circuit is smaller, i.e., sensitivity of a threshold voltage of a second transistor is smaller. That is, for the pixel drive circuit shown in FIG. 11, under a state in which the width W of the channel region of the eighth transistor is the same when the width-to-length ratio of the channel region of the eighth transistor is about 2/3 to 2/9, the larger the length L of the channel region of the eighth transistor is, the lower the sensitivity of the threshold voltage of the second transistor is, and the better the improvement to the sensitivity of the threshold voltage of the second transistor is.

An embodiment of the present disclosure also provides a drive method of a pixel drive circuit, configured to drive a pixel drive circuit. The drive method of the pixel drive circuit according to the embodiment of the present disclosure may include following acts.

In act 100, providing, by a node control sub-circuit, a signal of an initial signal terminal to a first node under control of a reset signal terminal, providing a signal of the initial signal terminal to a fourth node under control of a second control terminal, providing, by the node control sub-circuit, a signal of a second node to the first node and a signal of a data signal terminal to a third node under control of a scan signal terminal, and adjusting, by the node control sub-circuit, a signal of the first node or the second node under control of a first control terminal.

In act 200, providing, by a drive sub-circuit, a drive current to the second node under control of the first node and the third node.

In act 300, providing, by a light emitting control sub-circuit, a signal of a first power terminal to the third node and a signal of the second node to the fourth node under control of a light emitting control terminal.

The pixel drive circuit is the pixel drive circuit according to any one of the foregoing embodiments, and an implementation principle and implementation effects are similar, which will not be repeated here.

An embodiment of the present disclosure also provides a display apparatus, including: pixel drive circuits arranged in an array.

A pixel drive circuit is the pixel drive circuit according to any one of the foregoing embodiments, and an implementation principle and implementation effects are similar, which will not be repeated here.

In an exemplary embodiment, the display apparatus may be a product or component with any display function, such as a display, a television, a mobile phone, a tablet computer, a navigator, a digital photo frame, and a wearable display product.

In an exemplary embodiment, a signal of a scan signal terminal of a pixel drive circuit in an i-th row is the same as a signal of a reset signal terminal of a pixel drive circuit in an (i+1)-th row, wherein i is a positive integer greater than or equal to 1 and smaller than M, and M is a total number of rows of pixel drive circuits.

The accompanying drawings in the present disclosure only involve structures involved in the embodiments of the present disclosure, and for other structures, reference may be made to usual designs.

For the sake of clarity, in accompanying drawings used for describing the embodiments of the present disclosure, a thickness and a dimension of a layer or a micro structure are enlarged. It may be understood that when an element such as a layer, a film, a region, or a substrate is described as being "on" or "under" another element, the element may be "directly" located "on" or "under" the another element, or there may be an intermediate element.

Although implementation modes disclosed in the present disclosure are as above, the described contents are only implementation modes used for convenience of understanding the present disclosure and are not intended to limit the present disclosure. Any person skilled in the art to which the present disclosure pertains may make any modification and variation in forms and details of implementation without departing from the spirit and scope disclosed in the present disclosure. However, the scope of patent protection of the present disclosure is still subject to the scope defined in the appended claims.

The invention claimed is:

1. A pixel drive circuit, configured to drive a light emitting element to emit light, comprising: a node control sub-circuit, a light emitting control sub-circuit, and a drive sub-circuit; wherein a working process of the pixel drive circuit comprises: an initialization stage, a data writing stage, and a light emitting stage;

the node control sub-circuit is electrically connected with a first power terminal, a reset signal terminal, an initial signal terminal, a first control terminal, a second control terminal, a scan signal terminal, a data signal terminal, a first node, a second node, a third node, and a fourth node respectively, and is configured to provide a signal from the initial signal terminal to the first node under control of a signal from the reset signal terminal, provide a signal from the initial signal terminal to the fourth node under control of a signal from the second control terminal, provide a signal from the second node to the first node and a signal from the data signal terminal to the third node under control of a signal from the scan signal terminal, and adjust a signal from the first node or the second node under control of a signal from the first control terminal;

the drive sub-circuit is electrically connected with the first node, the second node, and the third node respectively, and is configured to provide a drive current to the second node under control of signals from the first node and the third node;

the light emitting control sub-circuit is electrically connected with a light emitting control terminal, the first power terminal, the second node, the third node, and the fourth node respectively, and is configured to provide a signal from the first power terminal to the third node and a signal from the second node to the fourth node under control of a signal from the light emitting control terminal; and the light emitting element is electrically connected with the fourth node and a second power terminal respectively;

wherein in the data writing stage and the light emitting stage, signals from the scan signal terminal and the first control terminal are mutually inverted signals, wherein the node control sub-circuit comprises: two first transistors connected in series, two second transistors connected in series, a fourth transistor, a seventh transistor, an eighth transistor, the drive sub-circuit comprises: a third transistor, and the light emitting control sub-circuit comprises: a fifth transistor and a sixth transistor;

wherein the two second transistors and the eighth transistor have a same transistor type; and a width of a channel region of the eighth transistor is about 1 micron to 3 microns, and a length of the channel region of the eighth transistor is about 3 microns to 9 microns.

2. The pixel drive circuit according to claim 1, wherein the node control sub-circuit comprises: a first reset sub-circuit, a second reset sub-circuit, a compensation sub-circuit, a writing sub-circuit, and an energy storage sub-circuit;

the first reset sub-circuit is electrically connected with the reset signal terminal, the initial signal terminal, and the first node respectively, and is configured to provide the signal from the initial signal terminal to the first node under control of the signal from the reset signal terminal;

the second reset sub-circuit is electrically connected with the second control terminal, the initial signal terminal, and the fourth node respectively, and is configured to provide the signal from the initial signal terminal to the fourth node under control of the signal from the second control terminal;

the compensation sub-circuit is electrically connected with the first control terminal, the scan signal terminal, the first node, and the second node respectively, and is configured to provide the signal from the second node to the first node under control of the signal from the scan signal terminal, and adjust the signal from the first node or the second node under control of the signal from the first control terminal;

the writing sub-circuit is electrically connected with the scan signal terminal, the data signal terminal, and the third node respectively, and is configured to provide a signal from the data signal terminal to the third node under control of the signal from the scan signal terminal; and the energy storage sub-circuit is electrically connected with the first node and the first power terminal respectively, and is configured to store a voltage difference between the first node and the first power terminal.

3. The pixel drive circuit according to claim 2, wherein the first reset sub-circuit comprises: the two first transistors connected in series, and the second reset sub-circuit comprises: the seventh transistor;

a control electrode of a first transistor is electrically connected with the reset signal terminal, a first electrode of the first transistor is electrically connected with the initial signal terminal, and a second electrode of the first transistor is electrically connected with a first electrode of a second first transistor;

a control electrode of the second first transistor is electrically connected with the reset signal terminal, and a second electrode of the second first transistor is electrically connected with the first node; and a control electrode of the seventh transistor is electrically connected with the second control terminal, a first electrode of the seventh transistor is electrically connected with the initial signal terminal, and a second electrode of the seventh transistor is electrically connected with the fourth node.

4. The pixel drive circuit according to claim 2, wherein the compensation sub-circuit comprises: the two second transistors connected in series and the eighth transistor;

a control electrode of a first second transistor is electrically connected with the scan signal terminal, a first electrode of the first second transistor is electrically connected with the second node, and a second electrode of the first second transistor is electrically connected with a first electrode of a second second transistor;

a control electrode of the second second transistor is electrically connected with the scan signal terminal, and a second electrode of the second second transistor is electrically connected with a first electrode of the eighth transistor; and a control electrode of the eighth transistor is electrically connected with the first control terminal, and a second electrode of the eighth transistor is electrically connected with the first node and a first electrode of the eighth transistor respectively.

5. The pixel drive circuit according to claim 2, wherein the compensation sub-circuit comprises: the two second transistors connected in series and the eighth transistor;

a control electrode of a first second transistor is electrically connected with the scan signal terminal, a first electrode of the first second transistor is electrically connected with a second electrode of the eighth transistor, and a second electrode of the first second transistor is electrically connected with a first electrode of a second second transistor;

a control electrode of the second second transistor is electrically connected with the scan signal terminal, and a second electrode of the second second transistor is electrically connected with the first node; and a control electrode of the eighth transistor is electrically connected with the first control terminal, and a first electrode of the eighth transistor is electrically connected with the second node and the second electrode of the eighth transistor respectively.

6. The pixel drive circuit according to claim 2, wherein the writing sub-circuit comprises: the fourth transistor, and the energy storage sub-circuit comprises: a capacitor;

a control electrode of the fourth transistor is electrically connected with the scan signal terminal, a first electrode of the fourth transistor is electrically connected with the data signal terminal, and a second electrode of the fourth transistor is electrically connected with the third node; and a first terminal of the capacitor is connected with the first power terminal, and a second terminal of the capacitor is electrically connected with the first node.

7. The pixel drive circuit according to claim 1, wherein a control electrode of the third transistor is electrically connected with the first node, a first electrode of the third transistor is connected with the second node, and a second electrode of the third transistor is connected with the third node;

a control electrode of the fifth transistor is electrically connected with the light emitting control terminal, a first electrode of the fifth transistor is electrically connected with the first power terminal, and a second electrode of the fifth transistor is electrically connected with the third node; and a control electrode of the sixth transistor is electrically connected with the light emitting control terminal, a first electrode of the sixth transistor is electrically connected with the second node, and a second electrode of the sixth transistor is electrically connected with the fourth node.

8. The pixel drive circuit according to claim 1, wherein the node control sub-circuit further comprises:

a control electrode of a first transistor is electrically connected with the reset signal terminal, a first electrode of the first transistor is electrically connected with the initial signal terminal, and a second electrode of the first transistor is electrically connected with a first electrode of a second first transistor;

a control electrode of the second first transistor is electrically connected with the reset signal terminal, and a second electrode of the second first transistor is electrically connected with the first node;

a control electrode of a first second transistor is electrically connected with the scan signal terminal, a first electrode of the first second transistor is electrically connected with the second node, and a second electrode of the first second transistor is electrically connected with a first electrode of a second second transistor;

a control electrode of the second second transistor is electrically connected with the scan signal terminal, and a second electrode of the second second transistor is electrically connected with a first electrode of the eighth transistor;

a control electrode of the third transistor is electrically connected with the first node, a first electrode of the third transistor is connected with the second node, and a second electrode of the third transistor is connected with the third node;

a control electrode of the fourth transistor is electrically connected with the scan signal terminal, a first electrode of the fourth transistor is electrically connected with the data signal terminal, and a second electrode of the fourth transistor is electrically connected with the third node;

a control electrode of the fifth transistor is electrically connected with the light emitting control terminal, a first electrode of the fifth transistor is electrically connected with the first power terminal, and a second electrode of the fifth transistor is electrically connected with the third node;

a control electrode of the sixth transistor is electrically connected with the light emitting control terminal, a first electrode of the sixth transistor is electrically connected with the second node, and a second electrode of the sixth transistor is electrically connected with the fourth node;

a control electrode of the seventh transistor is electrically connected with the second control terminal, a first electrode of the seventh transistor is electrically connected with the initial signal terminal, and a second electrode of the seventh transistor is electrically connected with the fourth node;

a control electrode of the eighth transistor is electrically connected with the first control terminal, and a second electrode of the eighth transistor is electrically connected with the first node and a first electrode of the eighth transistor respectively; and a first terminal of the capacitor is connected with the first power terminal, and a second terminal of the capacitor is electrically connected with the first node.

9. The pixel drive circuit according to claim 8, wherein in the initialization stage, signals from the scan signal terminal and the first control terminal are mutually inverted signals.

10. The pixel drive circuit according to claim 8, wherein a moment when the signal from the second control terminal is converted from a valid level signal to an invalid level signal is earlier than a moment when a signal from the light emitting control terminal is converted from an invalid level signal to a valid level signal.

11. The pixel drive circuit according to claim 1, wherein the node control sub-circuit further comprises a capacitor;

a control electrode of a first transistor is electrically connected with the reset signal terminal, a first electrode of the first transistor is electrically connected with the initial signal terminal, and a second electrode of the first transistor is electrically connected with a first electrode of a second first transistor;

a control electrode of the second first transistor is electrically connected with the reset signal terminal, and a second electrode of the second first transistor is electrically connected with the first node;

a control electrode of a first second transistor is electrically connected with the scan signal terminal, a first electrode of the first second transistor is electrically connected with a second electrode of the eighth transistor, and a second electrode of the first second transistor is electrically connected with a first electrode of a second second transistor;

a control electrode of the second second transistor is electrically connected with the scan signal terminal, and a second electrode of the second second transistor is electrically connected with the first node;

a control electrode of the third transistor is electrically connected with the first node, a first electrode of the third transistor is connected with the second node, and a second electrode of the third transistor is connected with the third node;

a control electrode of the fourth transistor is electrically connected with the scan signal terminal, a first electrode of the fourth transistor is electrically connected with the data signal terminal, and a second electrode of the fourth transistor is electrically connected with the third node;

a control electrode of the fifth transistor is electrically connected with the light emitting control terminal, a first electrode of the fifth transistor is electrically connected with the first power terminal, and a second electrode of the fifth transistor is electrically connected with the third node;

a control electrode of the sixth transistor is electrically connected with the light emitting control terminal, a first electrode of the sixth transistor is electrically connected with the second node, and a second electrode of the sixth transistor is electrically connected with the fourth node;

a control electrode of the seventh transistor is electrically connected with the second control terminal, a first electrode of the seventh transistor is electrically connected with the initial signal terminal, and a second electrode of the seventh transistor is electrically connected with the fourth node;

a control electrode of the eighth transistor is electrically connected with the first control terminal, and a first electrode of the eighth transistor is electrically connected with the second node and the second electrode of the eighth transistor respectively; and a first terminal of the capacitor is connected with the first power terminal, and a second terminal of the capacitor is electrically connected with the first node.

12. The pixel drive circuit according to claim 1, wherein in the initialization stage, signals from the scan signal terminal and the first control terminal are mutually inverted signals.

13. The pixel drive circuit according to claim 1, wherein a moment when the signal from the second control terminal is converted from a valid level signal to an invalid level signal is earlier than a moment when a signal from the light emitting control terminal is converted from an invalid level signal to a valid level signal.

14. The pixel drive circuit according to claim 13, wherein the second control terminal is a reset signal terminal or a scan signal terminal.

15. The pixel drive circuit according to claim 1, wherein the light emitting element comprises an organic light emitting diode; and an anode of the organic light emitting diode is electrically connected with the fourth node, and a cathode of the organic light emitting diode is electrically connected with the second power terminal.

16. A display apparatus, comprising: pixel drive circuits according to claim 1 arranged in an array.

17. The display apparatus according to claim 16, wherein a signal from a scan signal terminal of a pixel drive circuit in an i-th row is the same as a signal from a reset signal terminal of a pixel drive circuit in an (i+1)-th row, wherein i is a positive integer greater than or equal to 1 and smaller than M, and M is a total number of rows of the pixel drive circuits.

18. A drive method of a pixel drive circuit, configured to drive the pixel drive circuit according to claim 1, wherein the method comprises:

providing, by a node control sub-circuit, a signal from an initial signal terminal to a first node under control of a signal from a reset signal terminal, providing a signal from the initial signal terminal to a fourth node under control of a signal from a second control terminal, providing, by the node control sub-circuit, a signal from a second node to the first node and a signal from a data signal terminal to a third node under control of a signal from a scan signal terminal, and adjusting, by the node control sub-circuit, a signal from the first node or the second node under control of a signal from a first control terminal;

providing, by a drive sub-circuit, a drive current to the second node under control of signals from the first node and the third node; and providing, by a light emitting control sub-circuit, a signal from a first power terminal to the third node and a signal from the second node to the fourth node under control of a signal from a light emitting control terminal.

* * * * *